(12) United States Patent
Oh

(10) Patent No.: US 11,550,499 B2
(45) Date of Patent: Jan. 10, 2023

(54) STORAGE DEVICE FOR ERROR DETECTION AND CORRECTION OF ROM DATA

(71) Applicant: SK hynix Inc., Gyeonggi-do (KR)

(72) Inventor: Young Chan Oh, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 75 days.

(21) Appl. No.: 16/685,654

(22) Filed: Nov. 15, 2019

(65) Prior Publication Data

US 2021/0034293 A1 Feb. 4, 2021

(30) Foreign Application Priority Data

Jul. 30, 2019 (KR) .......................... 10-2019-0092322

(51) Int. Cl.
*G06F 3/06* (2006.01)

(52) U.S. Cl.
CPC .......... *G06F 3/0659* (2013.01); *G06F 3/0604* (2013.01); *G06F 3/0652* (2013.01); *G06F 3/0656* (2013.01); *G06F 3/0679* (2013.01)

(58) Field of Classification Search
CPC .... G06F 3/0659; G06F 3/0604; G06F 3/0652; G06F 3/0656; G06F 3/0679
See application file for complete search history.

(56) References Cited

U.S. PATENT DOCUMENTS

| 4,584,673 A | * | 4/1986 | Kuijk | ................. | G06F 11/1008 365/219 |
| 2003/0093612 A1 | * | 5/2003 | Ootani | ................. | G06F 12/0246 711/103 |
| 2008/0184065 A1 | * | 7/2008 | Thorp | .................... | G11C 16/20 714/6.12 |
| 2012/0163081 A1 | * | 6/2012 | Park | ................... | G11C 16/0483 365/185.11 |
| 2017/0139771 A1 | * | 5/2017 | Chung | ................. | G06F 3/0619 |
| 2017/0153826 A1 | * | 6/2017 | Cho | ...................... | G06F 3/0656 |
| 2017/0220268 A1 | * | 8/2017 | Guha | .................... | G06F 3/0688 |

FOREIGN PATENT DOCUMENTS

| KR | 10-2016-0075175 | 6/2016 |
| KR | 10-1692432 | 1/2017 |

* cited by examiner

*Primary Examiner* — Arpan P. Savla
*Assistant Examiner* — Eric T Loonan
(74) *Attorney, Agent, or Firm* — IP & T Group LLP

(57) ABSTRACT

A storage device detects an error of ROM data and corrects the error. The storage device includes a memory device and a memory controller for controlling the memory device. The memory device includes a plurality of planes each storing Read Only Memory (ROM) data, and a ROM data controller configured to control the plurality of planes based on whether the ROM data from all of the planes are the same. The memory controller includes an operation state determiner configured to output to the ROM data controller a ROM data output command for reading the ROM data respectively stored in the plurality of planes, according to an operation state of the memory device.

13 Claims, 22 Drawing Sheets

FIG. 6

| ROMDATA_P | ROMDATA_R |
|---|---|
| C524 | C524 |
| C909 | C901 |
| C538 | C520 |
| C520 | AC14 |
| 9E02 | C31F |

STORAGE DEVICE FOR ERROR DETECTION AND CORRECTION OF ROM DATA

CROSS-REFERENCE TO RELATED APPLICATION

The present application claims priority under 35 U.S.C. § 119(a) to Korean patent application number 10-2019-0092322, filed on Jul. 30, 2019, which is incorporated herein by reference in its entirety.

BACKGROUND

Field of Invention

The present disclosure generally relates to an electronic device, and more particularly, to a storage device and an operating method thereof.

Description of Related Art

A storage device is configured to store data under the control of a host device such as a computer, a smart phone or a smart pad. The storage device may of the type that stores data on a magnetic disk, such as a Hard Disk Drive (HDD), or of the type that stores data on a semiconductor memory, i.e., a nonvolatile memory, such as a Solid State Drive (SSD) or a memory card.

The storage device may include a memory device configured to store data and a memory controller configured to control the memory device. The memory device may be a volatile memory device or a nonvolatile memory device. Examples of a nonvolatile memory device include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM a Resistive RAM (RRAM), a Ferroelectric RAM (FRAM), and the like.

SUMMARY

Embodiments provide a storage device capable of detecting an error of Read Only Memory (ROM) data and correcting the error, and an operating method of the storage device.

In accordance with an aspect of the present disclosure, there is provided a storage device comprising, a memory device including, a plurality of planes each storing Read Only Memory (ROM) data, and a ROM data controller configured to control the plurality of planes based on whether the ROM data from all of the planes are the same and a memory controller for controlling the memory device, wherein the memory controller includes an operation state determiner configured to output to the ROM data controller a ROM data output command for reading the ROM data respectively stored in the plurality of planes according to an operation state of the memory device.

In accordance with another aspect of the present disclosure, there is provided a storage device comprising, a memory device including, a plurality of planes, a ROM configured to store ROM data including codes for a program operation, a read operation, and an erase operation, respectively, and output the codes and a ROM data controller configured to control the plurality of planes, based on a result obtained by determining whether the ROM data respectively stored in the plurality of planes and the ROM data stored in the ROM are all the same and a memory controller for controlling the memory device and including an operation state determiner configured to output a ROM data output command for reading the ROM data respectively stored in the plurality of planes and the ROM, according to an operation state of the memory device.

In accordance with still another aspect of the present disclosure, there is provided a storage device comprising, a plurality of memory devices each including a memory block configured to store Read Only Memory (ROM) data including codes to be decoded to perform a program operation, a read operation, and an erase operation, respectively and a memory controller for controlling the plurality of memory devices and including, a buffer memory configured to store ROM data initially identical to the ROM data respectively stored in the plurality of memory devices, an operation state determiner configured to output a ROM data command for reading the ROM data respectively stored in the plurality of memory devices and a ROM data output request for outputting the ROM data stored in the buffer memory, based on an operation state of each of the plurality of memory devices and a chip kill controller configured to output a chip kill command or ROM data transmission request according to whether the ROM data received from the plurality of memory devices, in response to the ROM data output command, and the ROM data received from the buffer memory, in response to the ROM data output request, are the same and a remaining life of the plurality of memory devices.

In accordance with still another aspect of the present disclosure, there is provided a memory system comprising, one or more storage devices each including one or more storages each configured to store a piece of read-only-memory (ROM) data and a ROM data maintenance component configured to, identify a majority of the pieces of ROM data, which are the same and correct each piece of ROM data that is not of the majority based on the majority of the pieces of ROM data, wherein the ROM data is related to an operation of the storage devices.

In accordance with still another aspect of the present disclosure, there is provided a memory system comprising, one or more storage devices each including one or more storage units each configured to store a piece of read-only-memory (ROM) data, a memory configured to store a piece of the ROM data and a ROM data maintenance component configured to, identify a majority of the pieces of ROM data, which are the same and control, when a piece of ROM data stored in the memory does not belong to the majority, the storage devices to operate based on the majority of the pieces of ROM data, wherein the ROM data is related to an operation of the storage devices.

In accordance with still another aspect of the present disclosure, there is provided a memory system comprising, one or more storage devices each including one or more storages each configured to store a piece of read-only-memory (ROM) data, a memory configured to store a piece of the ROM data and a ROM data maintenance component configured to, identify a majority of the pieces of ROM data, which are the same and control one or more of the storage devices storing pieces of ROM data that do not belong to the majority not to operate, wherein the ROM data is related to an operation of the storage apparatuses.

In accordance with still another aspect of the present disclosure, there is provided a memory system comprising, one or more storage devices each including one or more storages each configured to store a piece of read-onlymemory (ROM) data, a memory configured to store a piece of the ROM data and a ROM data maintenance component configured to, identify a majority of the pieces of ROM data, which are the same and control, when the piece of ROM data stored in the memory belongs to the majority, the storage devices to correct remaining pieces of ROM data that do not belong to the majority based on the piece stored in the memory, wherein the ROM data is related to an operation of the storage devices.

BRIEF DESCRIPTION OF THE DRAWINGS

Various embodiments are described more fully below with reference to the accompanying drawings; however, the present invention may be embodied in different forms and should not be construed as limited to the embodiments set forth herein. Rather, these embodiments are provided so that this disclosure is thorough and complete and fully convey the scope of the embodiments to those skilled in the art.

In the drawing figures, dimensions may be exaggerated for clarity of illustration. Like reference numerals refer to like elements throughout. Throughout the specification, reference to "an embodiment", "another embodiment" or the like is not necessarily to only one embodiment, and different references to any such phrase are not necessarily to the same embodiment(s).

FIG. 6 illustrates a case where a Read Only Memory (ROM) data error occurs.

DETAILED DESCRIPTION

Figure 1:
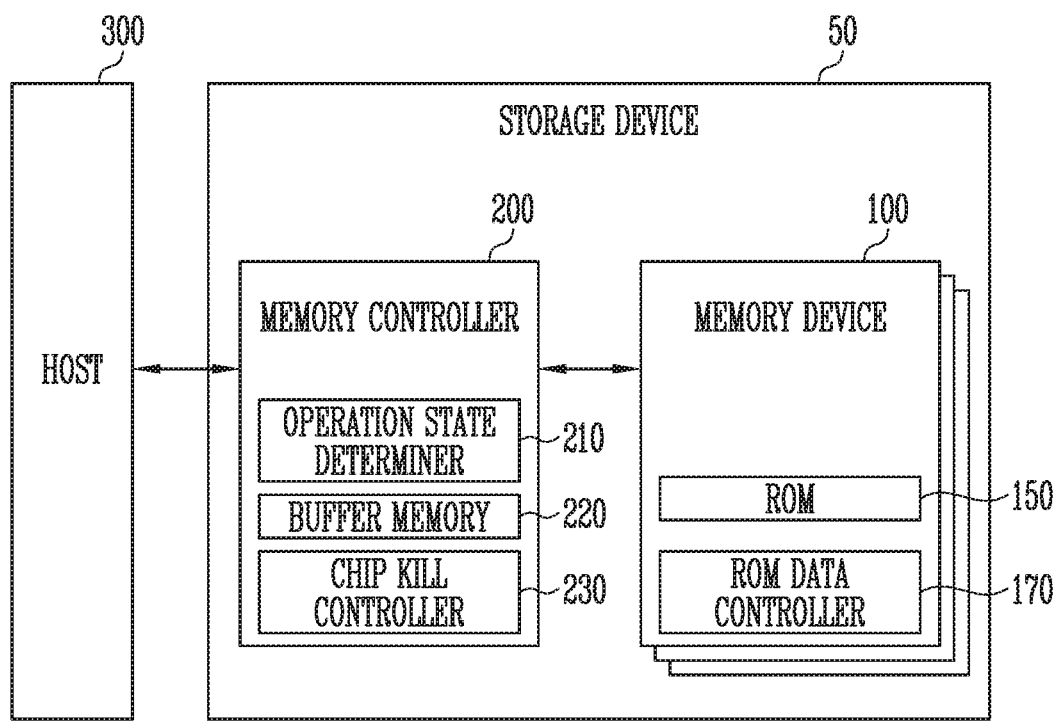
FIG. 1 is a block diagram illustrating a storage device.

The specific structural and functional description provided herein is for the purpose of describing embodiments of the present invention. The present invention, however, can be implemented in various forms and ways, and thus is not limited to the embodiments set forth herein.

While the present embodiments are described in detail, neither these embodiments themselves nor the invention as a whole is limited to any specific detail. Rather, the present invention encompasses all modifications and variations that fall within the scope of the claims.

While terms such as "first" and "second" may be used to identify various components, such components are not limited to or by the above terms. The above terms are used only to distinguish one component from another. For example, a first component in one instance may be referred to as a second component in another instance without implying any substantive change in the component itself.

It will be understood that when an element is referred to as being "connected" or "coupled" to another element, it can be directly connected or coupled to the other element or one or more intervening elements may also be present. In contrast, when an element is referred to as being "directly connected" or "directly coupled" to another element, no intervening elements are present. Moreover, when an element is referred to as being "between" two elements, such element may be the only element between the two elements or one or more intervening elements may be present.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having", etc., are intended to indicate the existence of the stated features, numbers, operations, actions, components, parts, or combinations thereof but are not intended to preclude the possibility that one or more other features, numbers, operations, actions, components, parts, or combinations thereof may exist or may be added.

So far as not being differently defined, all terms used herein including technical or scientific terminologies have meanings that are commonly understood by those skilled in the art to which the present disclosure pertains. Ordinary dictionary-defined terms have meanings consistent with the context of the related technique. So far as not being specifically defined in this application, terms should not be understood in an ideally or excessively formal way.

In describing embodiments herein, description of techniques that are well known to the art to which the present disclosure pertains and not directly related to the present disclosure may be omitted. Thus, the present disclosure focuses on features and aspects of the present invention.

Various embodiments of the present disclosure are described in detail below with reference to the accompanying drawings to enable those skilled in the art to readily implement and practice the present invention.

FIG. 1 is a block diagram illustrating a storage device.

Referring to FIG. 1, the storage device 50 may include a memory device 100 and a memory controller 200.

The storage device 50 may store data under the control of a host 300, such as a mobile phone, a smart phone, an MP3 player, a laptop computer, a desktop computer, a game console, a TV, a tablet PC or an in-vehicle infotainment.

The storage device 50 may be configured as any of various types of storage devices according to a host interface that is a communication scheme with the host 300. For example, the storage device 50 may be implemented with any of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any of various kinds of package types. For example, the storage device 50 may be manufactured as a Package-On-Package (POP), a System-In-Package (SIP), a System-On-Chip (SOC), a Mufti-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells, which may constitute a plurality of pages. In an embodiment, the page may be a unit for storing data in the memory device 100 or reading data stored in the memory device 100. The memory block may be a unit for erasing data.

The memory device 100 may include a Read Only memory (ROM) 150. ROM data may be stored in the ROM 150. The ROM data may be configured with a plurality of codes. The plurality of codes included in the ROM data may be used by the memory device 100 to perform a program operation, a read operation, an erase operation, and the like. Specifically, the memory device 100 may set an operating voltage, an operation time, and the like, which are used in each operation, by decoding the plurality of codes.

The memory device 100 may include a ROM data controller 170. When the ROM data controller 170 receives a ROM data output command from the memory controller 200, the ROM data controller 170 may output a ROM address at which ROM data is stored in each of a plurality of planes, and receive the ROM data from each plane. Alternatively, when the ROM data controller 170 receives ROM data respectively stored in the plurality of planes, the ROM data controller 170 may receive ROM data stored in the ROM 150 together with the ROM data respectively stored in the plurality of planes. The ROM data controller 170 may check whether the received ROM data are the same, and perform an operation for correcting ROM data, when all the ROM data are not the same.

In an embodiment, when the memory device 100 includes only one plane, the ROM data controller 170 may output, to a row decoder, a row address of specific memory blocks in which ROM data is stored among a plurality of memory blocks included in the one plane, and receive the ROM data from each memory block. The ROM data controller 170 may receive ROM data stored in the ROM 150 together with the ROM data received from each memory block. Whether the memory device 100 includes one or more planes, the ROM data controller 170 may check whether the received ROM data are the same, and perform an operation for correcting ROM data, etc., when all the ROM data are not the same.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, by way of example, features and aspects of the invention are described in the context in which the memory device 100 is a NAND flash memory.

In an embodiment, the memory device 100 may be implemented in a two-dimensional array structure or three-dimensional array structure. The present invention is not limited to any particular array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, the memory device 100 may be operated using a Single Level Cell (SLC) scheme in which one data bit is stored in one memory cell. Alternatively, the memory device 100 may be operated using a scheme in which at least two data bits are stored in one memory cell. For example, the memory cell 100 may be operated using a Multi-Level Cell (MLC) scheme in which two data bits are stored in one memory cell, a Triple Level Cell (TLC) scheme in which three data bits are stored in one memory cell, or a Quadruple Level Cell (QLC) scheme in which four data bits are stored in one memory cell.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation according to the received command. For example, when a program command is received, the memory device 100 may program data in the area selected by the address. When a read command is received, the memory device 100 may read data from the area selected by the address. When an erase command is received, the memory device 100 may erase data stored in the area selected by the address.

In an embodiment, a plurality of memory devices 50 may be included in the storage device 50. Each of the plurality of memory devices may be configured the same.

The memory controller 200 may include an operation state determiner 210. The operation state determiner 210 may receive operation state information on an operation state of the memory device from the memory device 100. The operation state of the memory device may be a ready state or a busy state. The ready state may include a state in which garbage collection is to be performed in the memory device 100. The operation state determiner 210 may output a ROM data output command and/or a ROM data output request, based on the operation state information received from the memory device 100.

The memory controller 200 may include a buffer memory 220. The buffer memory 220 may store ROM data. The ROM data stored in the buffer memory 220 may be received from any of a plurality of planes in the memory device or from the ROM 150 in the memory device 100 in an initialization operation of the memory device 100. The ROM data stored in the buffer memory 220 may be compared with ROM data stored in the ROM 150 and/or ROM data respectively stored in the plurality of planes. Alternatively, the ROM data stored in the buffer memory 220 may be compared with ROM data stored in a plurality of memory devices.

The memory controller 200 may include a chip kill controller 230. The chip kill controller 230 may receive ROM data information from the ROM data controller 170. The ROM data information may be generated when all pieces or items of ROM data received by the ROM data controller 170 are not the same. The ROM data information may include information representing that all the ROM data are not the same and information identifying some pieces ROM data, among all of the pieces of ROM data, which are the same. The chip kill controller 230 may control a memory device 100 storing ROM data other than the identified pieces of ROM data not to use its ROM data based on the ROM data information. Alternatively, the chip kill controller 230 may control ROM data stored in the buffer memory 220 to be output to the memory device 100 storing ROM data other than the identified pieces of ROM data.

The memory controller 200 may control overall operations of the storage device 50.

When a power voltage is applied to the storage device 50, the memory controller 200 may execute firmware (FW). When the memory device 100 is a flash memory device, the memory controller 200 may execute FW such as an FTL for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. Also, the memory controller 200 may store, in a buffer memory, a logical-physical address mapping table that establishes a mapping relationship between the LBA and the PBA.

The memory controller 200 may control the memory device 100 to perform a program operation, a read operation, an erase operation, or the like in response to a request from the host 300. For example, when a program request is received from the host 300, the memory controller 200 may change the program request into a program command, and provide the memory device 100 with the program command, a PBA, and data. When a read request is received together with an LBA from the host 300, the memory controller 200 may change the read request into a read command, select a PBA corresponding to the LBA, and then provide the memory device 100 with the read command and the PBA. When an erase request is received together with an LBA from the host 300, the memory controller 200 may change the erase request into an erase command, select a PBA corresponding to the LBA, and then provide the memory device 100 with the erase command and the PBA.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the storage device 50 may further include a buffer memory (not shown). The memory controller 200 may control data exchange between the host 300 and the buffer memory. Alternatively, the memory controller 200 may temporarily store system data for controlling the memory device 100 in the buffer memory. For example, the memory controller 200 may temporarily store data input from the host 300 in the buffer memory, and then transmit the data temporarily stored in the buffer memory to the memory device 100.

In various embodiments, the buffer memory may be used as a working memory or cache memory of the memory controller 200. The buffer memory may store codes or commands executed by the memory controller 200. Alternatively, the buffer memory may store data processed by the memory controller 200.

In an embodiment, the buffer memory may be implemented with a Dynamic Random Access Memory (DRAM) such as a Double Data Rate Synchronous DRAM (DDR SDRAM), a DDR4 SDRAM, a Low Power Double Data Rate 4 (LPDDR4) SDRAM, a Graphics Double Data Rate (GDDR) SRAM, a Low Power DDR (LPDDR), or a Rambus Dynamic Random Access Memory (RDRAM), or a Static Random Access Memory (SRAM).

In various embodiments, the buffer memory may be external to the storage device 50 and coupled thereto. Therefore, volatile memory devices 100 external and coupled to the storage device 50 may perform functions of the buffer memory.

In an embodiment, the memory controller 200 may control at least two memory devices 100. The memory controller 200 may control the memory devices according to an interleaving scheme so as to improve operational performance.

The host 300 may communicate with the storage device 50, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

Figure 2:
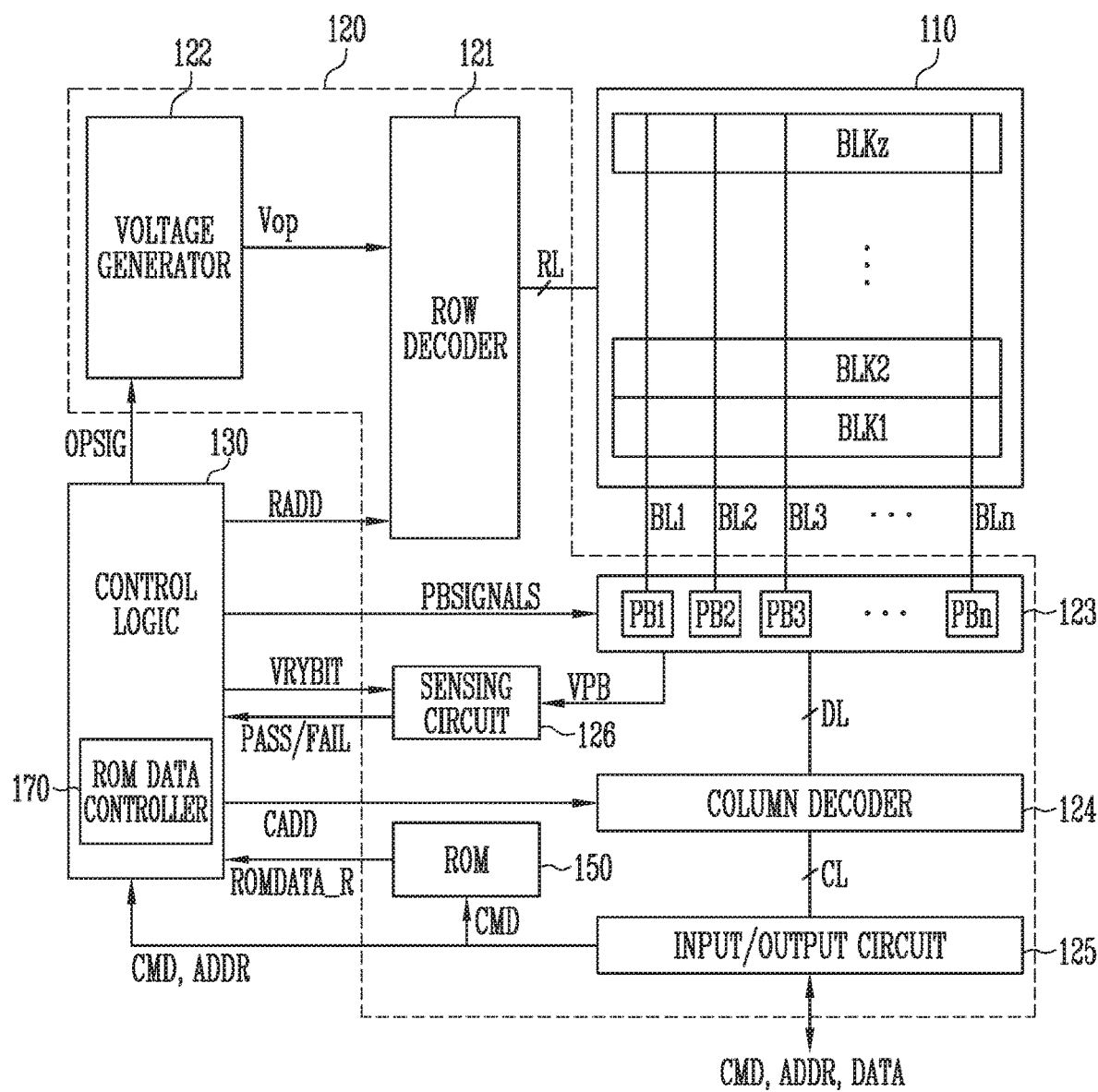
FIG. 2 is a diagram illustrating a structure of a memory device shown in FIG. 1.

FIG. 2 is a diagram illustrating a structure of a memory device shown in FIG. 1.

Referring to FIG. 2, the memory device 100 may include a memory cell array 100, a peripheral circuit 120, control logic 130, and a Read Only Memory (ROM) 150.

The memory cell array 110 includes a plurality of memory blocks BLK1 to BLKz, which are coupled to a row decoder 121 through row lines RL. The plurality of memory blocks BLK1 to BLKz are coupled to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells coupled to the same word line may be defined as one page. Therefore, one memory block may include a plurality of pages.

The row lines RL may include at least one source select line, a plurality of word lines, and at least one drain select line.

Each of the memory cells included in the memory cell array 110 may be programmed or read using a Single Level Cell (SLC) scheme in which one memory cell stores one data bit, a Multi-Level Cell (MLC) scheme in which one memory cell stores two data bits, a Triple Level Cell (TLC) scheme in which one memory cell stores three data bits, or a Quad Level Cell (QLC) scheme in which one memory cell stores four data bits.

The peripheral circuit 120 may perform a program operation, a read operation or an erase operation on a selected region of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, the voltage generator 122, the page buffer group 123, a column decoder 124, an input/output circuit 125, and the ROM 150.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 decodes row address RADD received from the control logic 130. The row decoder 121 selects at least one memory block among the memory blocks BLK1 to BLKz according to the decoded address. Also, the row decoder 121 may select at least one word line of the selected memory block to apply voltages generated by the voltage generator 122 to the at least one word line WL according to the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage having a level higher than that of the verify voltage to the unselected word lines.

In a read operation, the row decoder 121 may apply a read voltage to the selected word line, and apply a read pass voltage having a level higher than that of the read voltage to the unselected word lines.

In an embodiment, an erase operation of the memory device 100 is performed in a unit of a memory block. In the erase operation, the row decoder 121 may select one memory block according to the decoded address. In the erase operation, the row decoder 121 may apply a ground voltage to word lines coupled to the selected memory blocks.

The voltage generator 122 operates under the control of the control logic 130. The voltage generator 122 generates a plurality of voltages by using an external power voltage supplied to the memory device 100. Specifically, the voltage generator may generate various operating voltages Vop used in program, read, and erase operations in response to an operation signal OPSIG. For example, the voltage generator 122 may generate a program voltage, a verify voltage, a pass voltage, a read voltage, an erased voltage, and the like under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage.

For example, the voltage generator 122 may include a plurality of pumping capacitors for receiving the internal power voltage, and generate the plurality of voltages by selectively activating the plurality of pumping capacitors under the control of the control logic 130.

The plurality of generated voltages may be supplied to the memory cell array 110 by the row decoder 121.

The page buffer group 123 includes first to nth page buffers PB1 to PBn, which are coupled to the memory cell array 110 respectively through first to nth bit lines BL1 to BLn. The first to nth bit lines BL1 to BLn operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense voltages or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page are programmed according to the transferred data DATA. In a program verify operation, the first to nth page buffers PB1 to PBn read page data by sensing voltages or currents received from the selected memory cells through the first to nth bit lines BL1 to BLn.

In a read operation, the first to nth page buffers PB1 to PBn read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn or apply an erase voltage.

The column decoder 124 may communicate data between the input/output circuit 125 and the page buffer group 123 in response to a column address CADD. For example the column decoder 124 may communicate data with the first to nth page buffers PB1 to PBn through data lines EL, or communicate data with the input/output circuit 125 through column lines CL.

The input/output circuit 125 may transfer a command CMD and an address ADDR, which are received from the controller 200 described with reference to FIG. 1, to the control logic 130, or exchange data DATA with the column decoder 124. Also, the input/output circuit 125 may output the command CMD received from the controller 2000 described with reference to FIG. 1 to the ROM 150.

In a read operation or verify operation, the sensing circuit 125 may generate a reference current in response to an allow bit VRYBIT signal, and output a pass or fail signal PASS/

FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIG-NALS, and the allow bit VRYBIT in response to the command CMD and the address ADDR. Also, the control logic 130 may determine whether the verify operation has passed or failed in response to the pass or fail signal PASS/FAIL.

Each of the memory cells included in the memory cell array 110 may be programmed to any one program state among a plurality of program states according to data stored therein. A target program state of a memory cell may be determined as any one of the plurality of program states according to data stored in the memory cell.

In an embodiment, the control logic 130 may include a ROM data controller 170. The ROM data controller 170 may receive ROM data stored in the memory cell array 110 and Rth ROM data ROMDATA_R stored in the ROM 150. The ROM data controller 170 may determine whether all pieces of the received ROM data are the same.

In an embodiment, when the memory cell array 110 is configured with a plurality of planes, the ROM data controller 170 may receive, for each plane, ROM data stored in a specific memory block. In an embodiment, when the memory cell array 110 is configured with only one plane, the ROM data controller 170 may receive ROM data from specific memory blocks in which the ROM data is stored.

When all the pieces of received ROM data are the same, the ROM data controller 170 may suspend an operation performed by the memory device 100. However, when all the pieces of received ROM data are not the same, the ROM data controller 170 may correct ROM data stored in the memory cell array 110. Alternatively, the ROM data controller 170 may control the memory device not to decode codes of the Rth ROM data ROMDATA_R but to decode codes of other pieces of ROM data stored in the memory cell array 110.

In an embodiment, the memory device 100 may include the ROM 150. The ROM 150 may receive a command CMD from the input/output circuit 125. The command received from the input/output circuit 125 may be a ROM data output command. When the ROM 150 receives the ROM data output command, Rth ROM data stored in the ROM 150 may be output to the control logic 130.

In an embodiment, Rth ROM data may be stored in the ROM 150. The Rth ROM data stored in the ROM 150 may include codes for controlling an operation performed by the memory device 100. The codes included in the Rth ROM data may be decoded when the memory device 100 performs the operation. The decoded codes may be used for the memory device to perform a program operation, a read operation, an erase operation, and the like. Specifically, a voltage applied to the memory device 100, output and reception of a signal, and movement to another code address may be determined based on the decoded codes.

Figure 3:
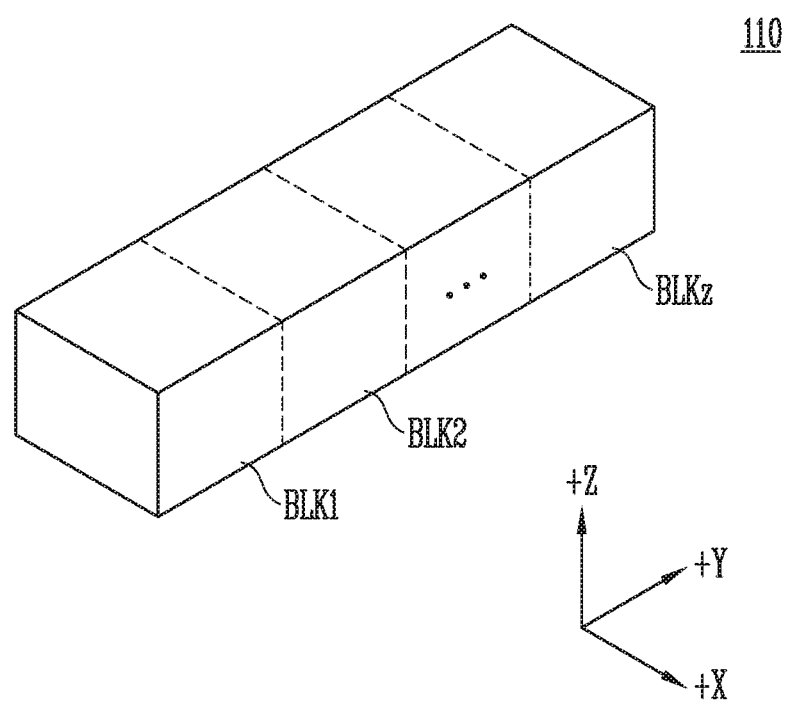
FIG. 3 is a diagram illustrating an embodiment of a memory cell array shown in FIG. 2.

FIG. 3 is a diagram illustrating an embodiment of a memory cell array shown in FIG. 2.

Referring to FIG. 3, the memory cell array 110 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions as indicated in the figure.

Figure 4:
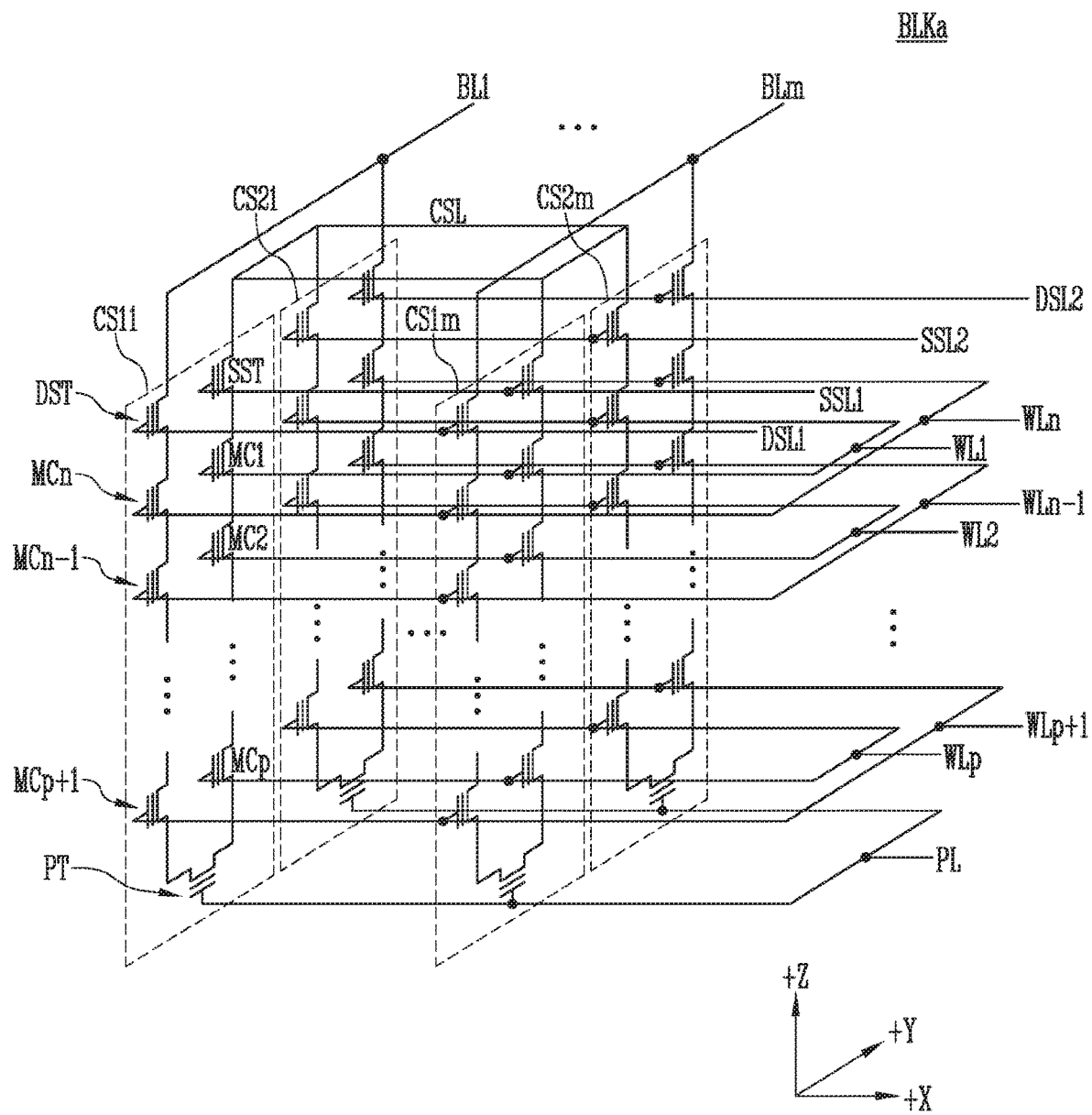
FIG. 4 is a circuit diagram illustrating any one of the memory blocks shown in FIG. 3.

FIG. 4 is a circuit diagram illustrating a representative memory block BLKa among the memory blocks BLK1 to BLKz shown in FIG. 3.

Referring to FIG. 4, the memory block BLKa may include a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (i.e., a +X direction). FIG. 4 illustrates two cell strings arranged in a column direction (i.e., a +Y direction). However, this is for clarity; more than two cell strings may be arranged in the column direction.

Each of the plurality of cell strings CS11 to CS1$m$ and CS21 to CS2$m$ may include at least one source select transistor SST, first to nth memory cells MC1 to MCn, a pipe transistor PT, and at least one drain select transistor DST.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. In FIG. 4, the source select transistors of the cell strings CS11 to CS1$m$ on a first row are coupled to a first source select line SSL1. The source select transistors of the cell strings CS21 to CS2$m$ on a second row are coupled to a second source select line SSL2.

In another embodiment, the source select transistors of the cell strings CS11 to CS1$m$ and CS21 to CS2$m$ may be commonly coupled to one source select line.

The first to nth memory cells MC1 to MCn of each cell string are coupled between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the −Z direction, and are coupled in series between the source select transistor SST and the pipe transistor PT. The (p+1)th to nth memory cells MCp+1 to MCn are sequentially arranged in the +Z direction, and are coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1$m$ on the first row are coupled to a first drain select line DSL1. The drain select transistors of the cell strings CS21 to CS2$m$ on the second row are coupled to a second drain select line DSL2.

Cell strings arranged in the column direction are coupled to a bit line extending in the column direction. In FIG. 4, the cell strings CS11 and CS21 on a first column are coupled to a first bit line BL1. The cell strings CS1$m$ and CS2$m$ on an mth column are coupled to an mth bit line BLm.

Memory cells coupled to the same word line in the cell strings arranged in the row direction constitute one page. For example, memory cells coupled to the first word line WL1 in the cell strings CS11 to CS1m on the first row constitute one page. Memory cells coupled to the first word line WL1 in the cell strings CS21 to CS2m on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to mth bit lines BL1 to BLm. In addition, even-numbered cell strings among the cell strings CS11 to CS1m or CS21 to CS2m arranged in the row direction may be coupled to the even bit lines, respectively, and odd-numbered cell strings among the cell strings CS11 to CS1m or CS21 to CS2m arranged in the row direction may be coupled to the odd bit lines, respectively.

In an embodiment, at least one of the first to nth memory cells MC1 to MCn may be used as a dummy memory cell. For example, the dummy memory cell(s) may be provided to decrease an electric field between the source select transistor SST and the memory cells MC1 to MCp. Alternatively, the dummy memory cell(s) may be provided to decrease an electric field between the drain select transistor DST and the memory cells MCp+1 to MCn. When the number of dummy memory cells increases, the reliability of an operation of the memory block BLKa is improved. On the other hand, the size of the memory block BLKa increases. When the number of dummy memory cells decreases, the size of the memory block BLKa decreases. On the other hand, the reliability of an operation of the memory block BLKa may be deteriorated.

In order to efficiently control the dummy memory cell(s), each may have a required threshold voltage. Before or after an erase operation of the memory block BLKa, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

Figure 5:
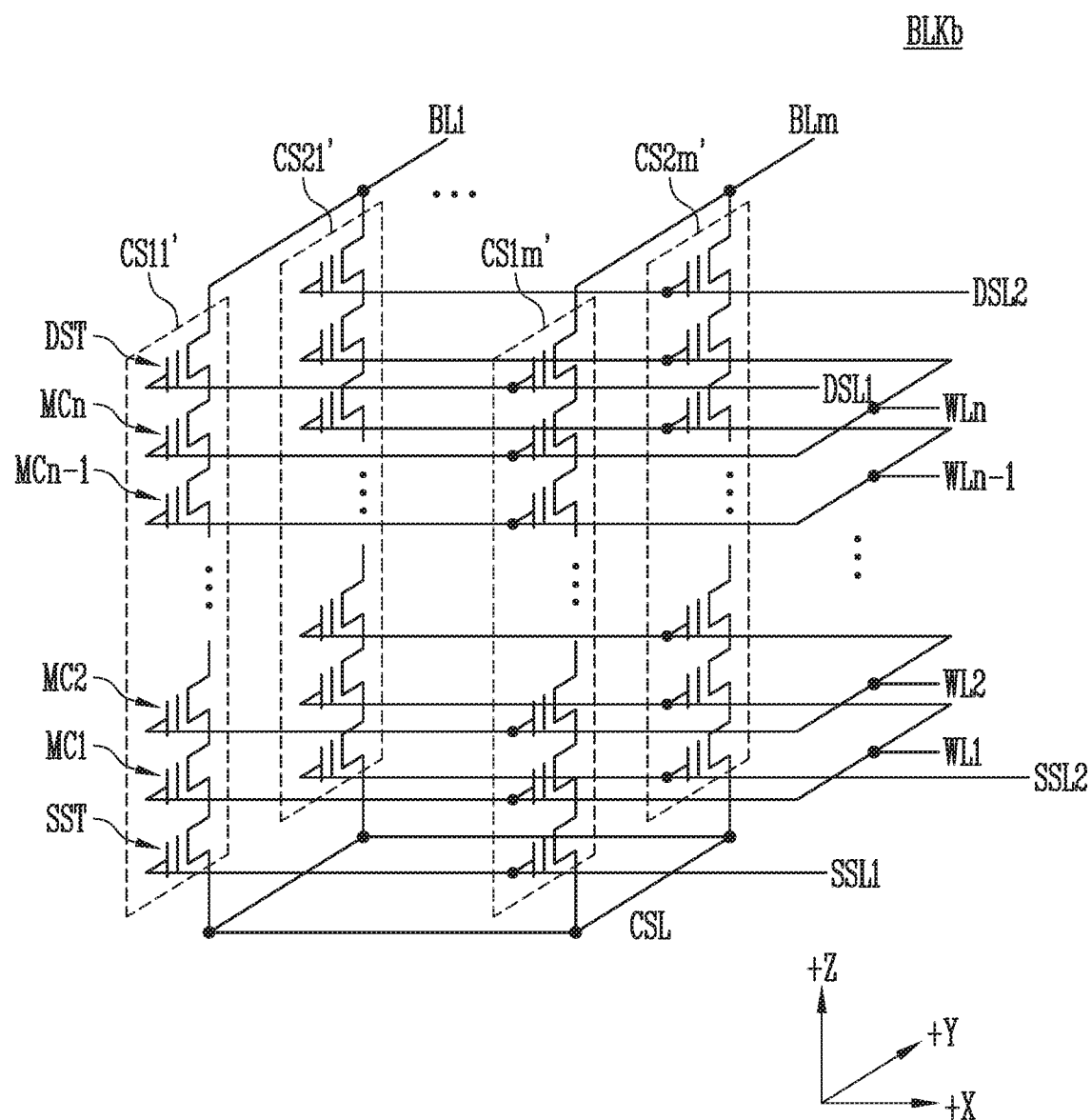
FIG. 5 is a circuit diagram illustrating another embodiment of any one of the memory blocks shown in FIG. 3.

FIG. 5 is a circuit diagram illustrating another embodiment of a representative memory block BLKb among the memory blocks BLK1 to BLKz shown in FIG. 3.

Referring to FIG. 5, the memory block BLKb may include a plurality of cell strings CS11' to CS1m' and CS21' to CS2m'. Each of the plurality of cell strings CS11' to CS1m' and CS21' to CS2m' extends along the +Z direction. Each of the plurality of cell strings CS11' to CS1m' and CS21' to CS2m' includes at least one source select transistor SST, first to nth memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1m' arranged on a first row are coupled to a first source select line SSL1. Source select transistors of the cell strings CS21' to CS2m' arranged on a second row are coupled to a second source select line SSL2. In another embodiment, the source select transistors of the cell strings CS11' to CS1m' and CS21' to CS2m' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1m' on the first row are coupled to a first drain select line DSL1. The drain select transistors of the cell strings CS21' to CS2m' on the second row are coupled to a second drain select line DSL2.

Consequently, the memory block BLKb of FIG. 5 has a circuit similar to that of the memory block BLKa of FIG. 4, except that the pipe transistor PT is excluded from each cell string in FIG. 5.

In another embodiment, even bit lines and odd bit lines may be provided instead of the first to mth bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In addition, at least one of the first to nth memory cells MC1 to MCn may be used as a dummy memory cell so as to decrease an electric field between the source select transistor SST and the memory cells MC1 to MCn.

FIG. 6 illustrates a case where a ROM data error occurs.

Referring to FIG. 6, a first column shown in FIG. 6 represents codes included in ROM data ROMDATA_P stored in any one plane among a plurality of planes included in a memory device, and a second column shown in FIG. 6 represents codes included in Rth ROM data ROMDATA_R stored in a ROM included in the memory device. In FIG. 6, a case where the ROM data of the first column is not changed is assumed.

In an embodiment, the codes of the first column shown in FIG. 6 may be some of codes used in any one operation among a program operation, a read operation, and an erase operation. That is, codes respectively read in operations performed by the memory device may be different from each other. In FIG. 6, a case where the codes of the first column are some of codes decoded when the memory device performs a program operation.

In an embodiment, the memory device may be configured with a single plane or a plurality of planes. When the memory device is configured with a single plane, a configuration of the memory device may be the same as that of the memory device 100 shown in FIG. 2. However, when the memory device is configured with a plurality of planes, each of the plurality of may include a plurality of memory blocks.

In the present disclosure, at least one plane included in the memory device 100 shown in FIG. 2 may include a prediction block in addition to the plurality of memory blocks. Alternatively, any one of the plurality of memory blocks may be set as a prediction block.

In an embodiment, in an initialization operation of the memory device 100 shown in FIG. 2, ROM data stored in the ROM may be stored in the prediction block. The ROM data stored in the prediction block may include codes divided according to operations performed by the memory device. That is, the codes included in the ROM data may be divided into codes respectively corresponding to the program operation, the read operation, and the erase operation.

After the ROM data stored in the ROM is stored in the prediction block, no operation is performed on the prediction block so that the ROM data stored therein is not changed.

In an embodiment, when an error occurs in at least one of the codes of the first column, the memory device may perform an erroneous operation. Specifically, when an error occurs in at least one of the codes of the first column, a threshold voltage distribution among a plurality of threshold voltage distributions may not be generated. Alternatively, data other than that corresponding to a read command may be read. Alternatively, an erase operation may be performed on a block that is not a target for such erase operation, thereby erasing the wrong memory block.

In FIG. 6, since a case where codes stored in a plane are not changed is assumed, C909 among the codes stored in the Read Only memory (ROM) 150 shown in FIG. 2 may be changed to C901. Therefore, since an error has occurred in C909, errors may also occur in codes to be subsequently decoded. Specifically, C538 is changed to C520, C520 is changed to AC14, and 9E02 is changed to C31F. Therefore, the codes in which errors occur may be decoded.

Since a case where the codes of the first column and the second column shown in FIG. 6 are codes decoded when a program operation is performed is assumed, a threshold voltage distribution among a plurality of threshold voltage distributions may not be generated as codes in which errors occur are decoded.

In another embodiment, an erroneous read operation or erroneous erase operation may be performed.

Figure 7:
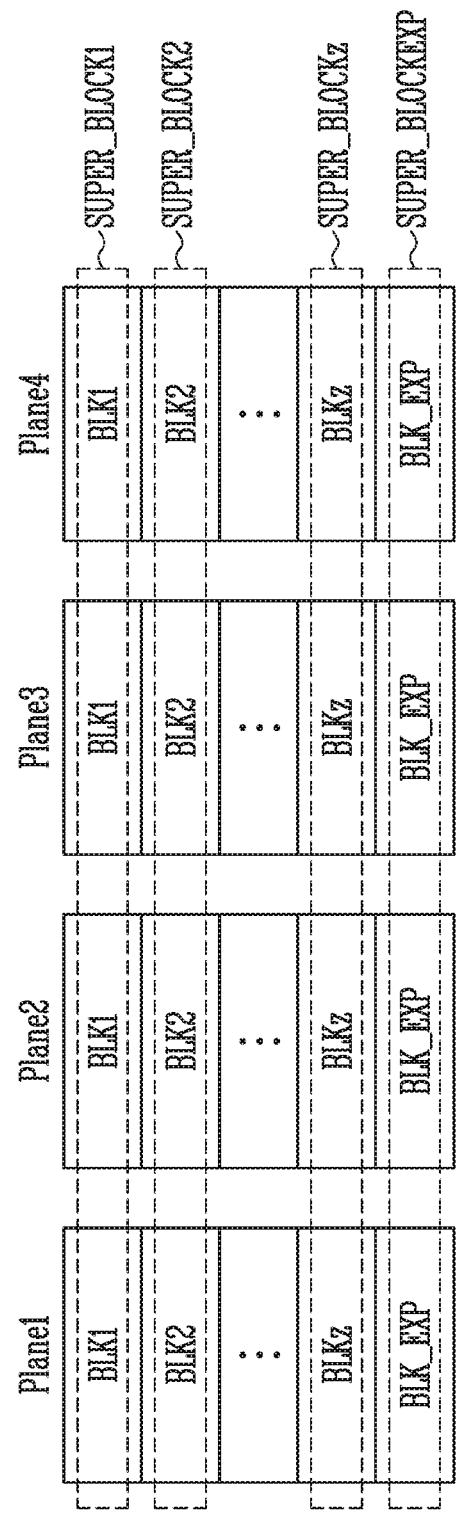
FIG. 7 is a diagram illustrating a structure of the memory device shown in FIG. 2 when the memory device includes a plurality of planes.

FIG. 7 is a diagram illustrating a structure of the memory device shown in FIG. 2 but including a plurality of planes, e.g., Plane1 to Plane4, instead of one plane. While FIG. 7 shows a memory device with 4 planes, the invention is not limited to that configuration. More generally, the multi-plane memory device may include 2 or more planes.

For example, when the memory device includes only one plane, ROM data may be stored in specific memory blocks, among a plurality of memory blocks in the plane, in an initialization operation of the memory device. When ROM data are respectively stored in the specific memory blocks, the memory device may read the ROM data stored in the specific memory blocks, and determine whether all the read ROM data are the same.

In FIG. 7, each plane may include a plurality of memory blocks BLK1 to BLKz. In addition, memory blocks located the same position in the respective planes may constitute one super block. In an embodiment, each plane may include first to zth memory blocks, i.e., BLK1 to BLKz, and a prediction block BLK_EXP, and first to zth super blocks, i.e., SUPER_BLOCK1 to SUPER_BLOCKz, and a prediction super block SUPER_BLOCKEXP may be configured with memory blocks located at the same position in first to fourth planes, i.e, Plane1 to Plane4.

Each of the first to fourth planes may include a prediction block BLK_EXP in addition to first to zth memory blocks BLK1 to BLKz. That is, in FIG. 7, each of the first to fourth planes may include a prediction block BLK_EXP for storing ROM data. The prediction block BLK_EXP may be a memory block in which ROM data is programmed in the initialization operation of the memory device. The ROM data may include codes for allowing the memory device to perform an operation. The codes included in the ROM data may respectively correspond to the operations of the memory device.

In an embodiment, the prediction block in a given plane may be any one of the first to zth memory blocks BLK1 to BLKz instead of being an additional block. More generally, each plane includes multiple non-prediction memory blocks and a prediction memory block, whether it is allocated among all memory blocks or provided as a separate block.

In an embodiment, in the initialization operation of the memory device, ROM data may be stored in the prediction block BLK_EXP included in each plane. The ROM data in each prediction block initially may be identical to ROM data stored in the ROM in the memory device. That is, in the initialization operation of the memory device, ROM data stored in the ROM may be read, and then may be programmed in the prediction block BLK_EXP of each plane. Therefore, the ROM data programmed in the prediction block BLK_EXP may be identical to the ROM data stored in the ROM.

In the present disclosure, ROM data stored in the prediction blocks BLK_EXP of the respective planes may be kept in a super block unit to facilitate checking whether such ROM data is all the same. That is, ROM data stored in the prediction blocks of the prediction super block SUPER_BLOCKEXP may be read, and it may be determined that all the read ROM data are the same.

A detailed operation of the memory device for determining whether ROM data are the same is described in more detail below with reference to FIG. 8.

Figure 8:
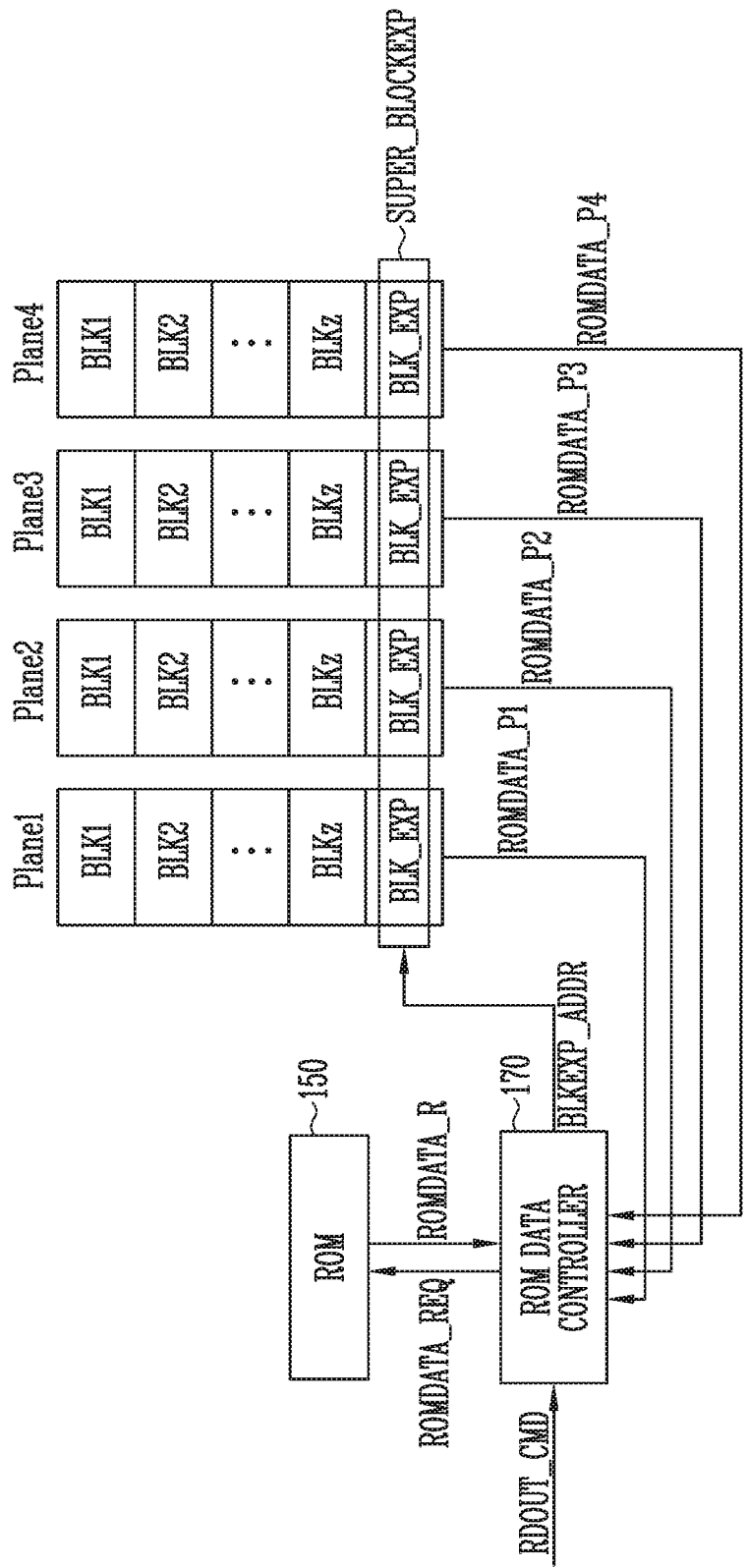
FIG. 8 illustrates a method for checking whether ROM data stored in a plurality of planes are the same.

FIG. 8 illustrates a method for checking whether ROM data stored in a plurality of planes are the same.

Referring to FIGS. 7 and 8, FIG. 8 illustrates a memory device including the plurality of planes, e.g., Plane1 to Plane4, shown in FIG. 7. In FIG. 8, the memory device may include the ROM 150 and the ROM data controller 170 in addition to the plurality of planes. The memory device of FIG. 8 may include other components, such as those shown in FIG. 2. These other components are omitted in FIG. 8 for clarity.

In an embodiment, ROM data stored in the prediction block BLK_EXP in Plane1 may be P1th ROM data ROM-DATA_P1, ROM data stored in the prediction block BLK_EXP in Planet may be P2th ROM data ROM-DATA_P2, ROM data stored in the prediction block BLK_EXP in Plane3 may be P3th ROM data ROM-DATA_P3, and ROM data stored in the prediction block BLK_EXP in Plane4 may be P4th ROM data ROM-DATA_P4. The ROM data stored in each plane may be read from the ROM 150 to be programmed in an initialization operation of the memory device.

In an embodiment, the ROM data controller 170 may receive a ROM data output command RDOUT_CMD from the memory controller 200 shown in FIG. 1. The ROM data controller 170 may generate a prediction block address BLKEXP_ADDR in response to the ROM data output command RDOUT_CMD. The ROM data controller 170 may receive ROM data from Plane1 to Plane4 according to the prediction block address BLKEXP_ADDR. The prediction block address BLKEXP_ADDR may correspond to the prediction block BLK_EXP included in each plane.

For example, the ROM data controller 170 may receive ROMDATA_P1 from BLK_EXP selected in Plane1, receive ROMDATA_P2 from BLK_EXP selected in Planet, receive ROMDATA_P3 from BLK_EXP selected in Plane3, and receive ROMDATA_P4 from BLK_EXP selected in Plane4 according to the prediction block address BLKEXP_ADDR. That is, the ROM data controller 170 may receive ROM data in a super block unit.

The ROM data controller 170 may determine whether the P1th to P4th ROM data ROMDATA_P1 to ROMDATA_P4 respectively stored in the prediction blocks BLK_EXP in the prediction super block SUPER_BLOCKEXP are all the same. That is, the ROM data controller 170 may determine whether the same codes are included in each of ROM-DATA_P1 to ROMDATA_P4.

In an embodiment, when the codes in ROMDATA_P1 to ROMDATA_P4 are all the same, the ROM data controller 170 may end an operation of checking ROM data.

In an embodiment, when the codes in ROMDATA_P1 to ROMDATA_P4 are not all the same, the ROM data controller 170 may determine that some, preferably most, of the pieces of ROM data, among ROMDATA_P1 to ROM-DATA_P4, are the same. For example, when ROM-DATA_P1 to ROMDATA_P3 are the same, the number of pieces of ROM data that are the same is "3" in this example, and the ROM data controller 170 may identify or label ROMDATA_P1 to ROMDATA_P3 as such, that is, as a majority of ROM data that is the same.

When the P1th to P3th ROM data ROMDATA_P1 to ROMDATA_P3 are determined as a majority of ROM data that are the same, it may be predicted that an error occurs in the P4th ROM data ROMDATA_P4. When it is predicted that an error occurs in ROMDATA_P4, the ROM data controller 170 may perform an operation for correcting the error in ROMDATA_P4, based on the majority of ROM data, or replacing ROMDATA_P4 with any one of the majority of ROM data. For example, when ROMDATA_P1 to ROMDATA_P3, among ROMDATA_P1 to ROM-DATA_P4, are the same, the ROM data controller 170 may perform an operation for correcting the error in ROM-DATA_P4 or replacing ROMDATA_P4 with any of ROM-DATA_P1 to ROMDATA_P3.

In an embodiment, when there is no majority of same ROM data, but there are different but equal sized groups, each having same ROM data, the ROM data controller 170 may additionally receive Rth ROM data ROMDATA_R as ROM data stored in the ROM 150. For example, when ROMDATA_P1 and ROMDATA_P2 are the same and ROMDATA_P3 and ROMDATA_P4 are the same, but ROMDATA_P1 and ROMDATA_P2 are different than ROMDATA_P3 and ROMDATA_P4, the ROM data controller 170 may additionally the Rth ROM data ROMDA-TA_R stored in the ROM 150.

Specifically, in the situation of no majority described above, the ROM data controller 170 may transmit a ROM data request ROMDATA_REQ to the ROM 150, and the ROM 150 may output ROMDATA_R to the ROM data controller 170 in response to ROMDATA_REQ. After the ROM data controller 170 receives ROMDATA_R stored in the ROM 150, the ROM data controller 170 may again determine a majority of same ROM data. When the majority of same ROM data are determined, the ROM data controller 170 may perform operations for predicting and correcting an error in non-majority ROM data based on the majority of ROM data or replacing the error-containing ROM data with any one of the majority of ROM data.

In an embodiment, in the situation of no majority, the ROM data controller 170 may receive ROMDATA_P1 to ROMDATA_P4 and the Rth ROM data ROMDATA_R stored in the ROM 150, additionally. After, the ROM data controller 170 may determine that some, preferably most, of the pieces of ROM data are the same. When the ROMDA-TA_R is not the one of a majority of ROM data, the ROM data controller 170 may determine that the majority of ROM data stored in the ROM 150 and in the prediction block BLK_EXP of any of the plurality of planes Plane1 to Plane4 is to be used. Specifically, when the memory device performs an operation of reading ROM data stored in the ROM 150, the ROM data controller 170 does not read ROMDA-TA_R stored in the ROM 150, but may control the memory device 100 to read any one of the majority of ROM data.

Figure 9:
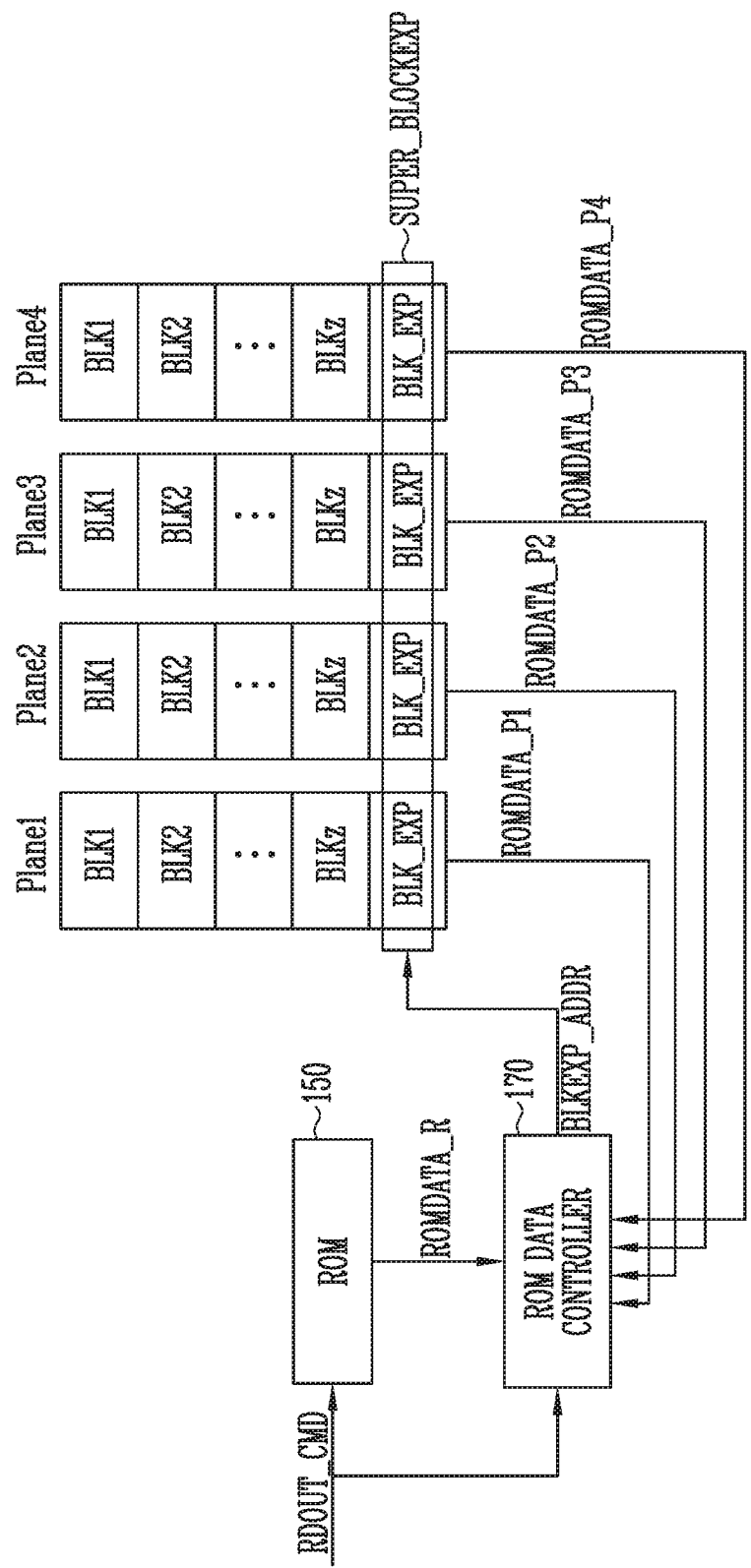
FIG. 9 illustrates a method for checking whether ROM data stored in a plurality of planes and a ROM are the same.

FIG. 9 illustrates a method for checking whether ROM data stored in a plurality of planes and the ROM accord with each other.

Referring to FIG. 9, the configuration shown in FIG. 9 is identical to that shown in FIG. 8, and therefore, common description is omitted here.

In an embodiment, the ROM data controller 170 and the ROM 150 may receive a ROM data output command RDOUT_CMD from the memory controller 200 shown in FIG. 1. Unlike in the configuration of FIG. 8, the ROM 150 may also receive the ROM data output command RDOUT_CMD from the memory controller 200 shown in FIG. 1.

The ROM data controller 170 may provide a prediction block address BLKEXP_ADDR to each plane, corresponding to the ROM data output command RDOUT_CMD, and receive ROM data ROMDATA_P1 to ROMDATA_P4 stored in the prediction blocks BLK_EXP from the respective planes. The ROM 150 may provide the ROM data controller 170 with an Rth ROM data ROMDATA_R as ROM data stored in the ROM 150.

The ROM data controller 170 may determine a majority of ROM data that are the same among the ROM data ROMDATA_P1 to ROMDATA_P4 received from the respective planes and the ROM data received from the ROM 150. That is, the ROM data controller 170 may determine whether the same codes are respectively included in ROM-DATA_P1 to ROMDATA_P4 and ROMDATA_R.

In an embodiment, when the codes included in the ROM-DATA_P1 to ROMDATA_P4 and ROMDATA_R are all the same, the ROM data controller 170 may end an operation of checking ROM data.

In an embodiment, when the codes included in ROM-DATA_P1 to ROMDATA_P4 and ROMDATA_R are not all the same, the ROM data controller 170 may determine a majority of pieces of ROM data that are the same among all of the pieces ROM data. For example, when ROMDATA_P ROMDATA_P2, and ROMDATA_R among ROM-DATA_P1 to ROMDATA_P4 and ROMDATA_R are the same, the number of the same ROM data is "3," and ROMDATA_P1, ROMDATA_P2, and ROMDATA_R may be determined as the majority of ROM data.

When ROMDATA_P1, ROMDATA_P2, and ROMDA-TA_R are determined as the majority of ROM data, it may be predicted that errors occur in ROMDATA_P3 and ROM-DATA_P4. When such prediction is made, the ROM data controller 170 may perform an operation for correcting the errors in ROMDATA_P3 and ROMDATA_P4, based on the majority of ROM data, or replacing each of ROMDATA_P3 and ROMDATA_P4 with any one of the majority of ROM data.

In an embodiment, when ROMDATA_R stored in the ROM 150 is not part of the majority of ROM data, the ROM data controller 170 may determine that ROM data stored in the prediction block BLK_EXP of any one of the plurality of planes Plane1 to Plane4 is to be used. Specifically, when the memory device performs an operation of reading ROM data stored in the ROM 150, the ROM data controller 170 does not read ROMDATA_R stored in the ROM 150, but may control the memory device 100 to read any one of the majority of ROM data.

Figure 10:
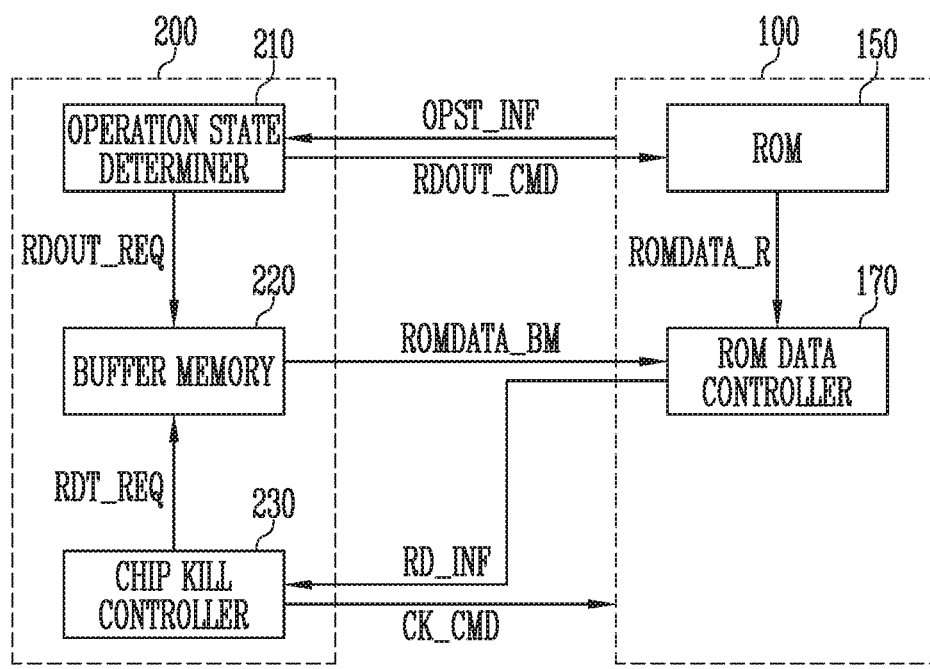
FIG. 10 illustrates a configuration of a memory controller shown in FIG. 1 and a method for checking whether ROM data stored in the buffer memory and in the memory controller are the same.

FIG. 10 illustrates a configuration of the memory controller shown in FIG. 1 and a method for checking whether ROM data are the same, when the ROM data are stored in the buffer memory in the memory controller.

Referring to FIG. 10, the memory controller 200 shown in FIG. 10 may include the operation state determiner 210, the buffer memory 220, and the chip kill controller 230, and the memory device 100 shown in FIG. 10 may include the ROM 150 and the ROM data controller 170.

In FIG. 10, ROM data initially identical to Rth ROM data ROMDATA_R stored in the ROM 150 may be stored in the buffer memory 220. BMth ROM data ROMDATA_BM stored in the buffer memory 220 may be received from the ROM 150 during fabrication of the storage device 50 or in an initialization operation of the storage device 50.

In an embodiment, the memory device 100 may output operation state information OPST_INF to the memory controller 200. The operation state information OPST_INF may include information on a state of the memory device 100, i.e., whether it is in a ready state or busy state. The memory controller 200 may perform an operation of determining whether ROM data are the same, based on the operation state information OPST_INF. The ready state may include a state in which Garbage Collection (GC) can be performed.

The operation state determiner 210 may receive operation state information OPST_INF from the memory device 100. When the operation state information OPST_INF indicates that the memory device 100 is in the ready state, the operation state determiner 210 may start an operation for determining whether ROM data are the same.

Specifically, the operation state determiner 210 may provide a ROM data output command RDOUT_CMD to the ROM, and provide a ROM data output request RDOUT_REQ to the buffer memory 220. The ROM data output command RDOUT_CMD may be for outputting the Rth ROM data ROMDATA_R stored in the ROM 150. The ROM data output request RDOUT_REQ may be for outputting the BMth ROM data ROMDATA_BM stored in the buffer memory 220.

In an embodiment, the ROM 150 may output the Rth ROM data ROMDATA_R to the ROM data controller 170 in response to the ROM data output command RDOUT_CMD. The buffer memory 220 may output the BMth Rom data ROMDATA_BM to the ROM data controller 170 in response to the ROM data output request RDOUT_REQ.

After the ROM data controller 170 receives the Rth ROM data ROMDATA_R and the BMth Rom data ROMDATA_BM, the ROM data controller 170 may determine whether the ROMDATA_R and the ROMDATA_BM are the same, and generate ROM data information RD_INF based on the determination result. The ROM data information RD_INF may be generated when ROM data received by the ROM data controller 170 are not all the same. The ROM data information RD_INF may include information representing that the received ROM data are not all the same and information on a majority of ROM data, among the ROM data, that are the same.

For example, when the Rth ROM data ROMDATA_R and the BMth Rom data ROMDATA_BM are not the same, the ROM data information RD_INF may be generated. However, since the number of pieces of ROM data received is 2, information on the majority of ROM data may not be included in the ROM data information RD_INF, since there is no possible majority in this instance.

In an embodiment, the chip kill controller 230 may receive the ROM data information RD_INF from the ROM data controller 170. The chip kill controller 230 may output a chip kill command CK_CMD or ROM data transmission request RDT_REQ, based on the received ROM data information RD_INF. That is, since the Rth ROM data ROMDATA_R and the BMth Rom data ROMDATA_BM are not the same, the chip kill controller 230 may perform an operation for solving the issue of these two pieces of ROM data not being the same.

Specifically, the chip kill command CK_CMD may be for controlling the memory device 100 from which the Rth ROM data ROMDATA_R is output but not to be used any more. In addition, the ROM data transmission request RDT_REQ may be an output request of the BMth Rom data ROMDATA_BM, which is provided to the buffer memory 220 such that the memory device 100 does not use the Rth ROM data ROMDATA_R but uses the BMth Rom data ROMDATA_BM stored in the buffer memory 220. Therefore, when the memory device 100 receives the chip kill command CK_CMD, the memory device 100 may not perform an operation any more. However, when the buffer memory 220 receives the ROM data transmission request RDT_REQ, the buffer memory 220 may output the ROMDATA_BM to the memory device 100, and the memory device 100 may perform an operation of decoding codes included in the BMth Rom data ROMDATA_BM.

In an embodiment, the chip kill controller 230 may determine whether the chip kill command CK_CMD or the ROM data transmission request RDT_REQ is to be output according to remaining life of the memory device 100. For example, when the remaining life of the memory device 100 is less than or equal to 20% of the total life of the memory device 100, the chip kill controller 230 may output the chip kill command CK_CMD to the memory device 100. On the contrary, when the remaining life of the memory device 100 exceeds 20% of the total life of the memory device 100, the chip kill controller 230 may provide the ROM data transmission request RDT_REQ to the buffer memory 220.

In an embodiment, the buffer memory 220 may output the BMth ROM data ROMDATA_BM to the memory device 100 in response to the ROM data transmission request RDT_REQ from the chip kill controller 230, and the memory device 100 may perform the operation of decoding the codes included in the BMth ROM data ROMDATA_BM when the memory device 100 performs the operation.

Figure 11:
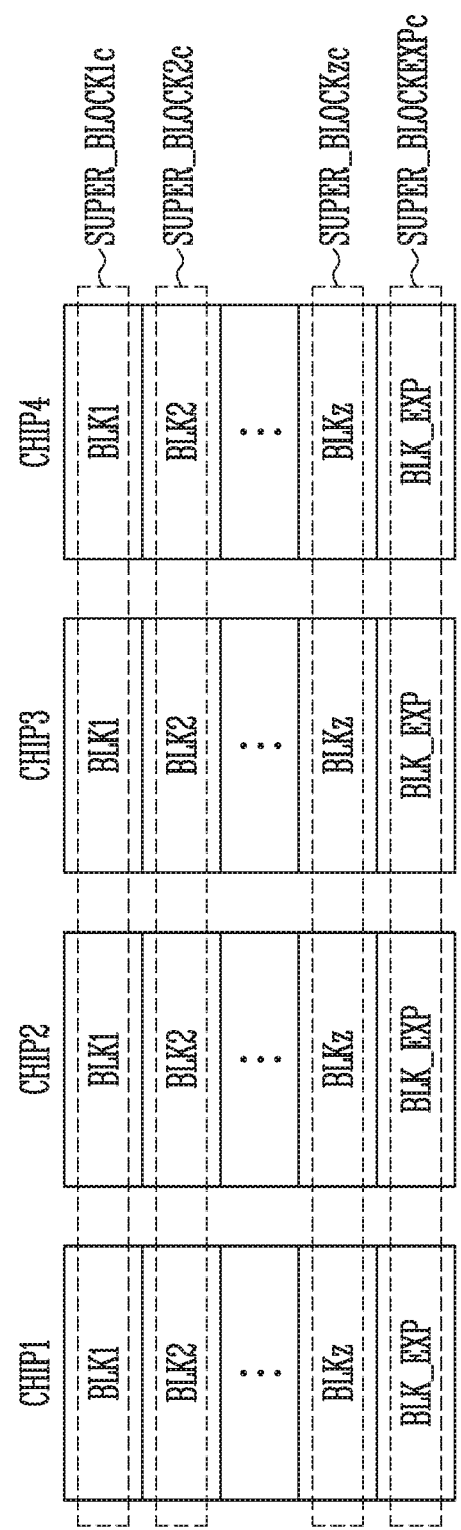
FIG. 11 illustrates a plurality of memory devices in which ROM data are stored.

FIG. 11 illustrates a plurality of memory devices in which ROM data are stored.

FIG. 11 illustrates a plurality of memory devices, i.e., chips included in the storage device 50 shown in FIG. 1. Each chip may include at least one plane, which may include a plurality of memory blocks. FIG. 11 illustrates an example of four memory devices, i.e., chips (CHIP1 to CHIP4), each of which includes one plane. The present invention, however, is not limited to this specific configuration. In another embodiment, each chip may include two or more planes.

In FIG. 11 a first chip CHIP1 may represent a first memory device, a second chip CHIP2 may represent a second memory device, a third chip CHIP3 may represent a third memory device, and a fourth chip CHIP4 may represent a fourth memory device. Each of the first to fourth chips CHIP1 to CHIP4 may include first to zth memory blocks BLK1 to BLKz and a prediction block BLK_EXP, and each of 1cth to zcth super blocks and a prediction super block may be configured with memory blocks located at the same position in the first to fourth chips CHIP1 to CHIP4.

Each prediction block BLK_EXP may store ROM data. The prediction block BLK_EXP may be a memory block in which ROM data is programmed in an initialization operation of the memory device. The ROM data may include codes for allowing the memory device to perform an operation. Different codes in the ROM data may correspond to different operations of the memory device.

In an embodiment, memory blocks located at the same position in the chips may constitute one super block. For example, the first memory blocks of the first to fourth chips CHIP1 to CHIP4 may constitute a 1cth super block SUPER_BLOCK1c, the second memory blocks of the first to fourth chips CHIP1 to CHIP4 may constitute a 2cth super block SUPER_BLOCK2c, the zth memory blocks of the first to fourth chips CHIP1 to CHIP4 may constitute a zth super block SUPER_BLOCKzc, and the prediction blocks of the first to fourth chips CHIP1 to CHIP4 may constitute a prediction super block SUPER_BLOCKEXPc.

In an embodiment, in an initialization operation of the memory devices, ROM data may be stored in the prediction block BLK_EXP included in each chip. The ROM data may be identical to ROM data stored in the ROM in the memory device. That is, in the initialization operation of the memory devices, ROM data stored in the ROM may be read, and the read ROM data may be programmed in the prediction block BLK_EXP of each chip. Therefore, the ROM data programmed in the prediction block may be identical to the ROM data stored in the ROM.

Although not shown in the drawing, in an embodiment, ROM data may be stored in specific memory blocks among a plurality of memory blocks in one chip. That is, in an initialization operation of the memory device, the ROM data may be stored in some memory blocks among the plurality of memory blocks included in the one chip. Therefore, the memory device may read the ROM data stored in the specific memory blocks, and determine whether the read ROM data are all the same.

In an embodiment, ROM data stored in the prediction blocks BLK_EXP of the respective planes may be checked in a super block unit. That is, ROM data stored in the prediction super block SUPER_BLOCKEXPc, which includes the prediction blocks of the respective chips, may be read, and it may be determined whether the read ROM data are all the same.

A detailed operation is described in more detail with reference to FIGS. 12 to 14.

Figure 12:
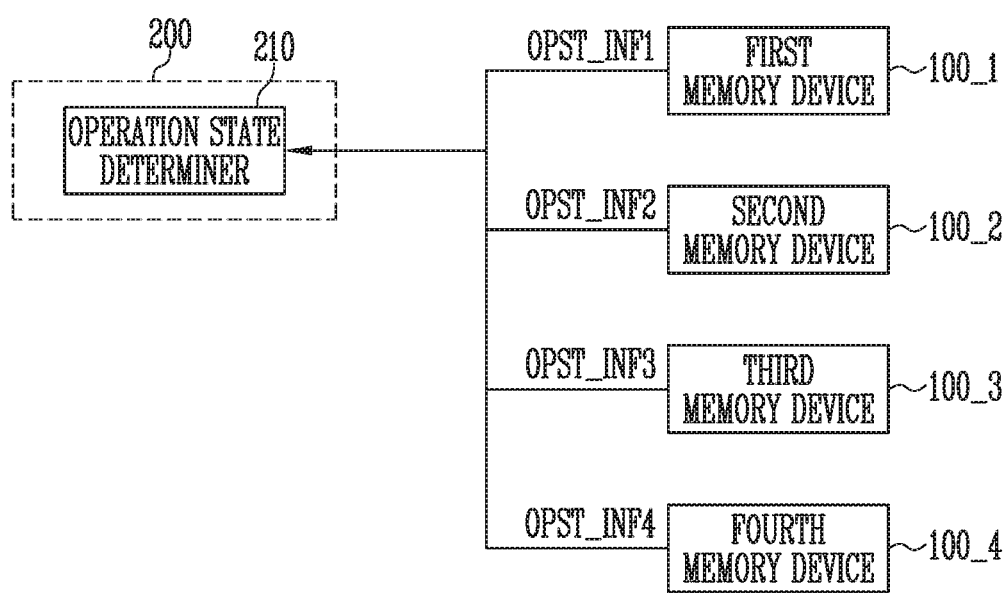
FIG. 12 illustrates conditions for starting ROM data error check, when ROM data are stored in a plurality of memory devices.

FIG. 12 illustrates conditions for starting ROM data error check, when ROM data are stored in a plurality of memory devices.

Referring to FIG. 12, the storage device shown in FIG. 12 may include first to fourth memory devices 100_1 to 100_4 and the memory controller 200. Each of the first to fourth memory devices 100_1 to 100_4 may include at least one chip. ROM data may be stored in a chip in each of the first to fourth memory devices 100_1 to 100_4. For clarity, FIG. 12 does not show the buffer memory 220 and the chip kill controller 230 as components of the memory controller 200. However, the memory controller 200 of FIG. 12 may include these components.

In an embodiment, the first to fourth memory devices 100_1 to 100_4 may output operation state information to the memory controller 200. The memory controller 200 may include an operation state determiner 210. For example, the first memory device 100_1 may output first operation state information OPST_INF1 to the operation state determiner 210, the second memory device 100_2 may output second operation state information OPST_INF2 to the operation state determiner 210, the third memory device 100_3 may output third operation state information OPST_INF3 to the operation state determiner 210, and the fourth memory device 100_4 may output fourth operation state information OPST_INF4 to the operation state determiner 210.

The first to fourth operation state information OPST_INF1 to OPST_INF4 may represent whether the first to fourth memory devices 100_1 to 100_4 are in a ready state or busy state, respectively. The ready state may include a state in which Garbage Collection (GC) can be performed. Each memory device may output, to the operation state determiner 210, each of the operation state information OPST_INF1 to OPST_INF4 including updated state information when the state of the memory device is changed.

For example, when the first memory device 100_1 outputted OPST_INF1 indicating that the first memory device 100_1 is in the ready state, but the state of the first memory device 100_1 later changes to the busy state, the first memory device 100_1 may output updated first operation state information OPST_INF1 indicating the busy state.

In an embodiment, when at least one of the first to fourth operation state information OPST_INF1 to OPST_INF4 does not indicate that the corresponding memory device is in the ready state, the memory controller 200 may not output any ROM data output request and/or any ROM data output command. That is, when the first to fourth operation state information OPST_INF1 to OPST_INF4 do not all indicate the ready state, the memory controller 200 may not start an operation for checking an error of ROM data. When the operation for checking an error of ROM data is performed in the busy state, this results in a delay of another operation of the storage device. Hence, the operation for checking an error of ROM data may be started when all the first to fourth operation state information OPST_INF1 to OPST_INF4 indicate the ready state.

Consequently, the operation state determiner 210 can receive the first to fourth operation state information OPST_INF1 to OPST_INF4 respectively from the first to fourth memory devices 100_1 to 100_4. When all the first to fourth operation state information OPST_INF1 to OPST_INF4 indicate the ready state, the operation state determiner 210 can start an operation for checking whether ROM data stored in the respective memory devices are the same.

Figure 13:
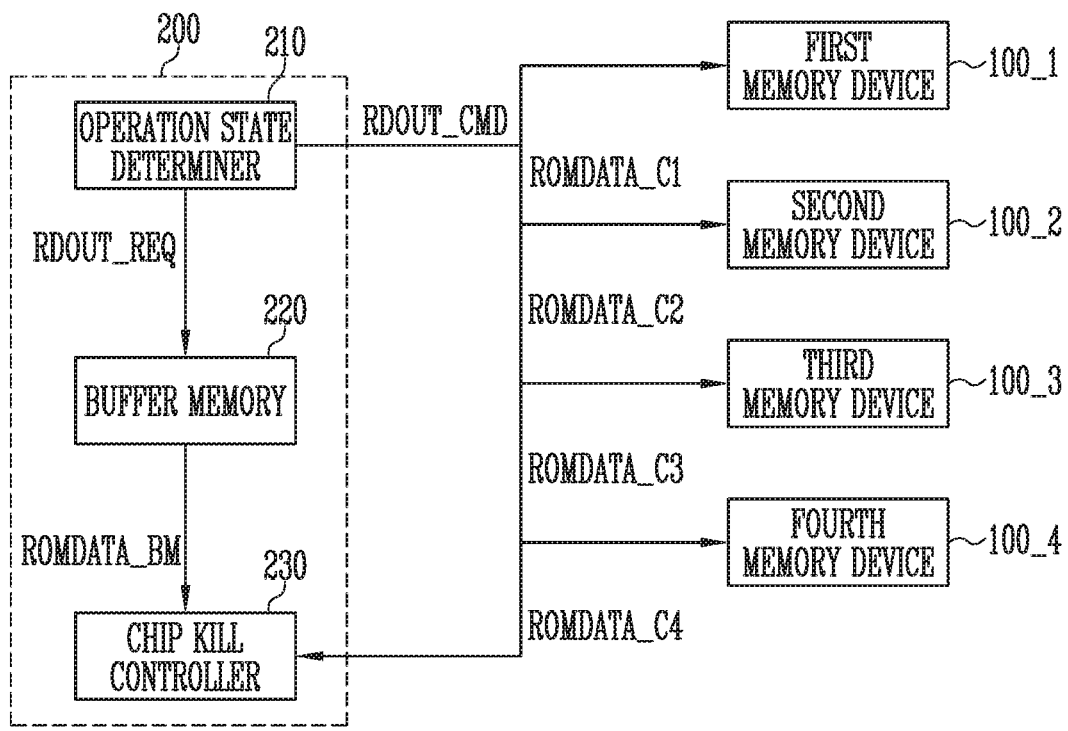
FIG. 13 illustrates a method for checking an error of ROM data, when the ROM data are stored in a plurality of memory devices.

FIG. 13 illustrates a method for checking an error of ROM data, when the ROM data are stored in a plurality of memory devices.

Referring to FIGS. 12 and 13, FIG. 13 illustrates operations of the memory controller 200 and the first to fourth memory devices 100_1 to 100_4 when all the first to fourth operation state information OPST_INF1 to OPST_INF4 shown in FIG. 12 indicate the ready state of their respective memory devices. ROM data stored in the buffer memory 220 shown in FIG. 12 may be received from any one of the plurality of memory devices in the initialization operation of the plurality of memory devices.

In an embodiment, when all the first to fourth operation state information OPST_INF1 to OPST_INF4 indicate the ready state, the operation state determiner 210 may output a ROM data output command RDOUT_CMD to the first to fourth memory devices 100_1 to 100_4, and output a ROM data output request RDOUT_REQ to the buffer memory 220.

The first to fourth memory devices 100_1 to 100_4 may output C1th to C4th ROM data ROMDATA_C1 to ROMDATA_C4 respectively stored in prediction blocks thereof to the chip kill controller 230, in response to the ROM data output command RDOUT_CMD. In addition, the buffer memory 220 may provide the chip kill controller 230 with BMth ROM data ROMDATA_BM corresponding to the ROM data output request RDOUT_REQ. The chip kill controller 230 may determine whether the received ROM data are all the same.

In FIGS. 8 to 10, the ROM data controller 170 determines whether the received ROM data are all the same. However, as shown in FIG. 13, when the storage device includes a plurality of memory devices, the chip kill controller 230 in the memory controller 200 may determine whether ROM data are the same. Consequently, the memory controller 200, instead of the memory device, can determine whether ROM data received from the memory devices and the ROM data stored in the buffer memory 220 in the memory controller 200 are all the same.

In an embodiment, the chip kill controller 230 may determine whether ROM data received from the buffer memory 220 and the first to fourth memory devices 100_1 to 100_4 are all the same. When the ROM data received from the buffer memory 220 and the first to fourth memory devices 100_1 to 100_4 are all the same, the chip kill controller 230 may end an operation of checking whether the ROM data are the same.

However, when the ROM data received from the buffer memory 220 and the first to fourth memory devices 100_1 to 100_4 are not all the same, the chip kill controller 230 may determine a majority of ROM data, which are the same among the C1th to C4th ROM data ROMDATA_C1 to ROMDATA_C4 and the BMth ROM data ROMDATA_BM. For example, when ROMDATA_C1, ROMDATA_C2, and ROMDATA_BM, among ROMDATA_C1 to ROMDATA_C4 and ROMDATA_BM, are the same, the number of the same ROM data is "3," and the chip kill controller 230 may determine the ROMDATA_C1, ROMDATA_C2, and ROMDATA_BM as the majority of ROM data.

When ROMDATA_C1, ROMDATA_C2, and ROMDATA_BM are determined as the majority of ROM data, it may be predicted that errors occur in ROMDATA_C3 and ROMDATA_C4. When such prediction is made, the ROM data controller may perform an operation of correcting the errors of ROMDATA_C3 and ROMDATA_C4 based on the majority of ROM data, or replacing ROMDATA_C3 and ROMDATA_C4 with any one of the majority of ROM data.

Figure 14:
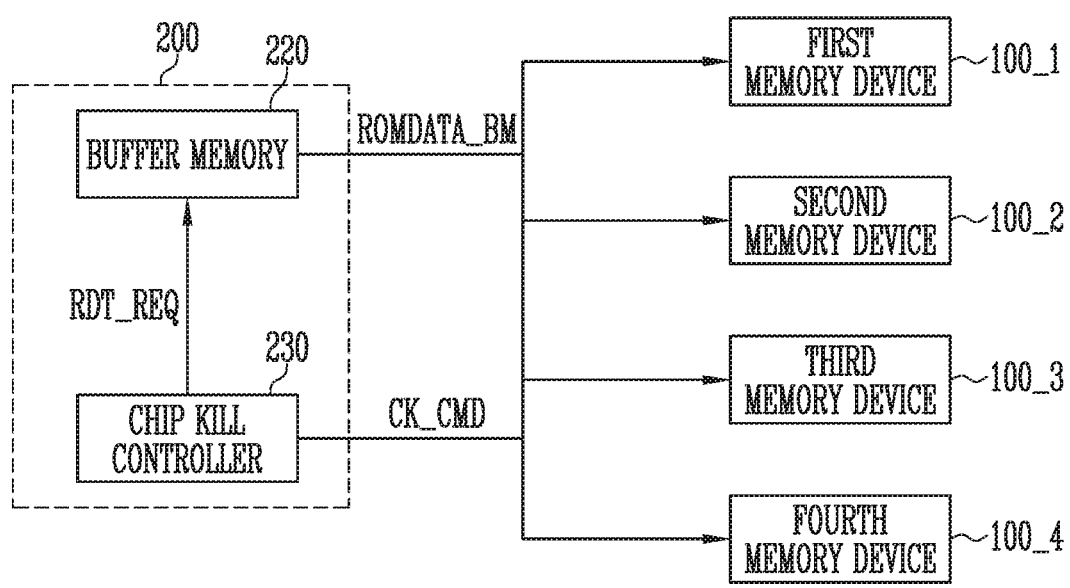
FIG. 14 illustrates an operation of the memory controller, when a ROM data error occurs.

FIG. 14 illustrates an operation of the memory controller, when a ROM data error occurs.

Referring to FIGS. 13 and 14, FIG. 14 illustrates an operation of the memory controller 200 after it is determined that the ROM data received from the buffer memory 220 and the first to fourth memory devices 100_1 to 100_4 are not all the same. For clarity, FIG. 14 does not show the operation state determiner 210, although it may be included in the memory controller 200.

In an embodiment, the chip kill controller 230 may output a chip kill command CK_CMD to at least one of the first to fourth memory devices 100_1 to 100_4 or output a ROM data transmission request RDT_REQ to the buffer memory 220. That is, since all the C1th to C4th ROM data ROMDATA_C1 to ROMDATA_C4 and the BMth ROM data ROMDATA_BM are not the same, the chip kill controller 230 may perform an operation for solving such discrepancy.

Specifically, the chip kill command CK_CMD may be for allowing a memory device storing ROM data other than the majority of ROM data, which are the same, not to operate any more. In addition, the ROM data transmission request RDT_REQ may be an output request of the BMth ROM data ROMDATA_BM, which is provided to the buffer memory 220 such that the memory device does not use non-majority ROM data but uses the BMth ROM data ROMDATA_BM stored in the buffer memory 220.

Therefore, a memory device receiving the chip kill command CK_CMD among the plurality of memory devices may no longer perform the operation. In addition, when the buffer memory 220 receives the ROM data transmission request RDT_REQ, the buffer memory 220 may output the BMth ROM data ROMDATA_BM to a memory device in which a minority of ROM data, which are not the same, are stored, and the corresponding memory device may perform the operation by decoding codes included in the BMth ROM data ROMDATA_BM.

In an embodiment, the chip kill controller 230 may determine wither the chip kill command CK_CMD or the ROM data transmission request RDT_REQ is to be output according to a remaining life of a memory device. For example, when the remaining life of a memory device is less than or equal to 20% of the total life of the memory device, the chip kill controller 230 may output the chip kill command CK_CMD to the corresponding memory device. On the contrary, when the remaining life of the memory device exceeds 20% of the total life of the memory device, the chip kill controller 230 may provide the ROM data transmission request RDT_REQ to the buffer memory 220, and the buffer memory 220 may output the BMth ROM data ROMDATA_BM to the corresponding memory device.

Figure 15:
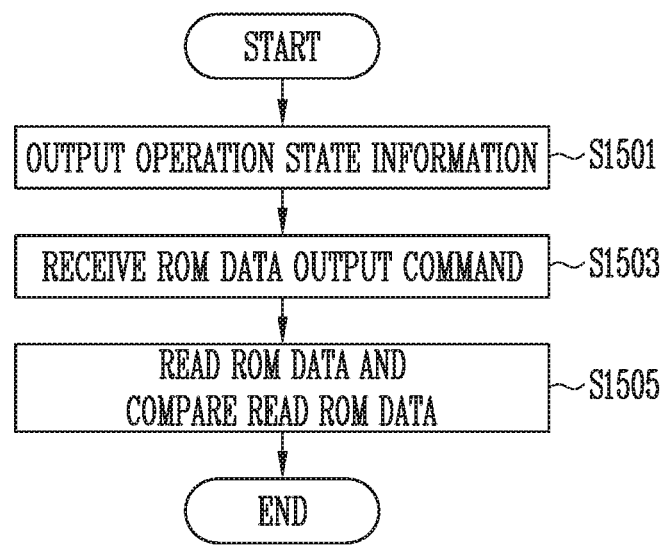
FIG. 15 is a diagram illustrating an operation of the memory device in accordance with an embodiment of the present disclosure.

FIG. 15 is a diagram illustrating an operation of the memory device in accordance with an embodiment of the present disclosure.

Referring to FIG. 15, in step S1501, the memory device may output operation state information to the memory controller. The operation state information may include information representing a ready state or busy state of the memory device. The ready state of the memory device may mean a state in which the memory device checks whether ROM data stored in a plurality of planes are the same or checks whether ROM data stored in the plurality of planes and the ROM are the same.

In step S1503, the memory device may receive a ROM data output command from the memory controller. The ROM data output command may be for reading ROM data stored in the plurality of planes. The ROM data output command may be output when the operation state information output by the memory device indicates the ready state.

The memory device may output a prediction block address to each plane according to the ROM data output command. The prediction block address may correspond to a prediction block in which ROM is stored.

In step S1505, the memory device may read ROM data stored in the plurality of planes, and compare the read ROM data. Specifically, the memory device may determine whether the read ROM data are all the same.

In an embodiment, when the read ROM data are all the same, the memory device may end an operation of comparing ROM data. When the read ROM data are not all the same, the memory device may determine a majority of ROM data that are the same, and perform an operation of correcting an error included in non-majority ROM data or replacing the non-majority ROM data with any one of the majority of ROM data.

In an embodiment, when it is determined that there is no majority of ROM data that are the same, ROM data stored in the ROM in the memory device may be additionally read. When the ROM data stored in the ROM is read, the memory device may again determine a majority of ROM data that are the same.

Figure 16:
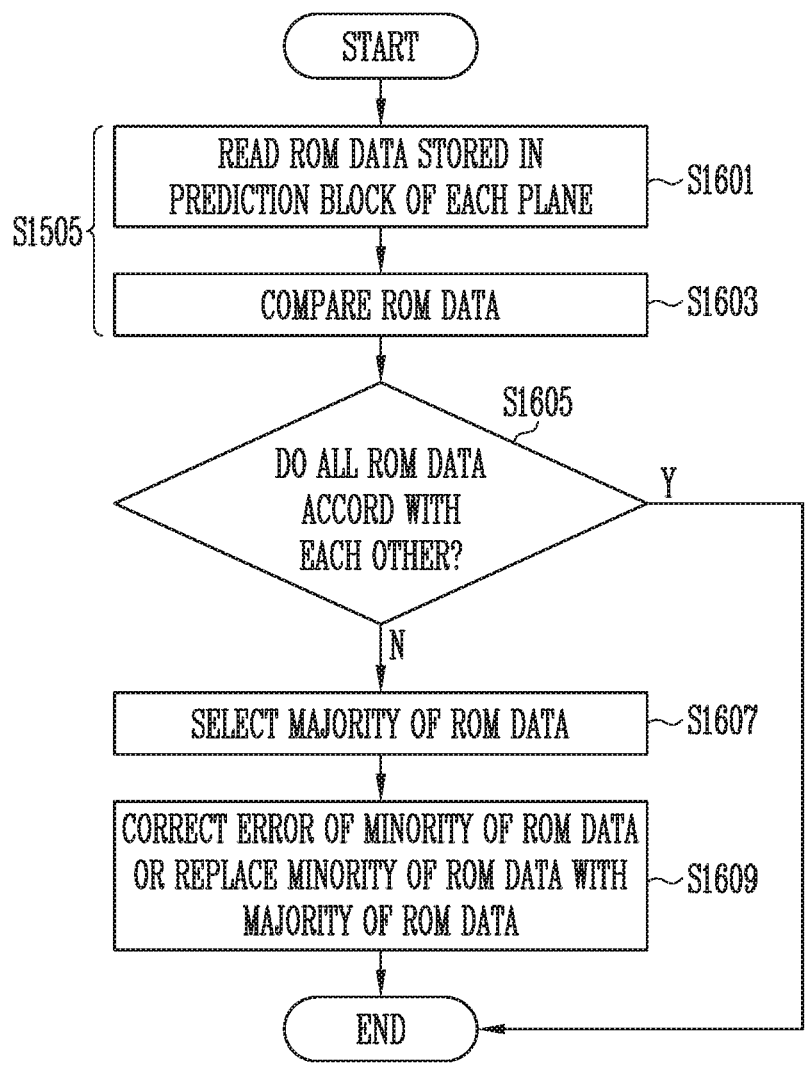
FIG. 16 is a diagram illustrating an operation of the memory device in accordance with an embodiment of the present disclosure.

FIG. 16 is a diagram illustrating an operation of the memory device in accordance with an embodiment of the present disclosure.

Referring to FIG. 16, steps S1601 and S1603 are substeps of step S1505.

In the step S1601, the memory device may read ROM data stored in a prediction block of each plane. In an embodiment, the memory device may include a plurality of planes, and read ROM data stored in a prediction block in each of the plurality of planes.

In the step S1603, the memory device may compare the read ROM data. In an embodiment, the memory device may determine whether ROM data read from the plurality of planes are the same. In an initialization operation of the memory device, ROM data identical to ROM data stored in the ROM is stored in the plurality of planes, and hence the read ROM data should be all the same. However, since ROM data stored in each plane may be changed (occurrence of an error), it is necessary to check whether the ROM data are the same.

In step S1605, the memory device may determine whether the read ROM data are the same. When all the read ROM data are the same (Y), the memory device may end an operation of comparing ROM data. However, when all the read ROM data are not the same (N), the memory device may select a majority of ROM data that are the same among the read ROM data (S1607).

For example, when P1th to P3rd ROM data among P1th to P4th ROM data are the same, the number of the same ROM data is "3," and the P1th to P3rd ROM data may be selected as the majority of ROM data.

When the majority of ROM data are selected, the memory device may determine that an error has occurred in remaining, or a minority of, ROM data (P4th ROM data in this example), and perform an operation for correcting the error of the minority of ROM data or replacing each piece of the minority of ROM data with a piece of the majority of ROM data (S1609).

Specifically, the memory device may output the minority of ROM data to the memory controller so as to correct the error of the minority of ROM data. Alternatively, the memory device may erase a prediction block in which the minority of ROM data is stored, and program any one of the majority of ROM data in the erased prediction block.

Figure 17:
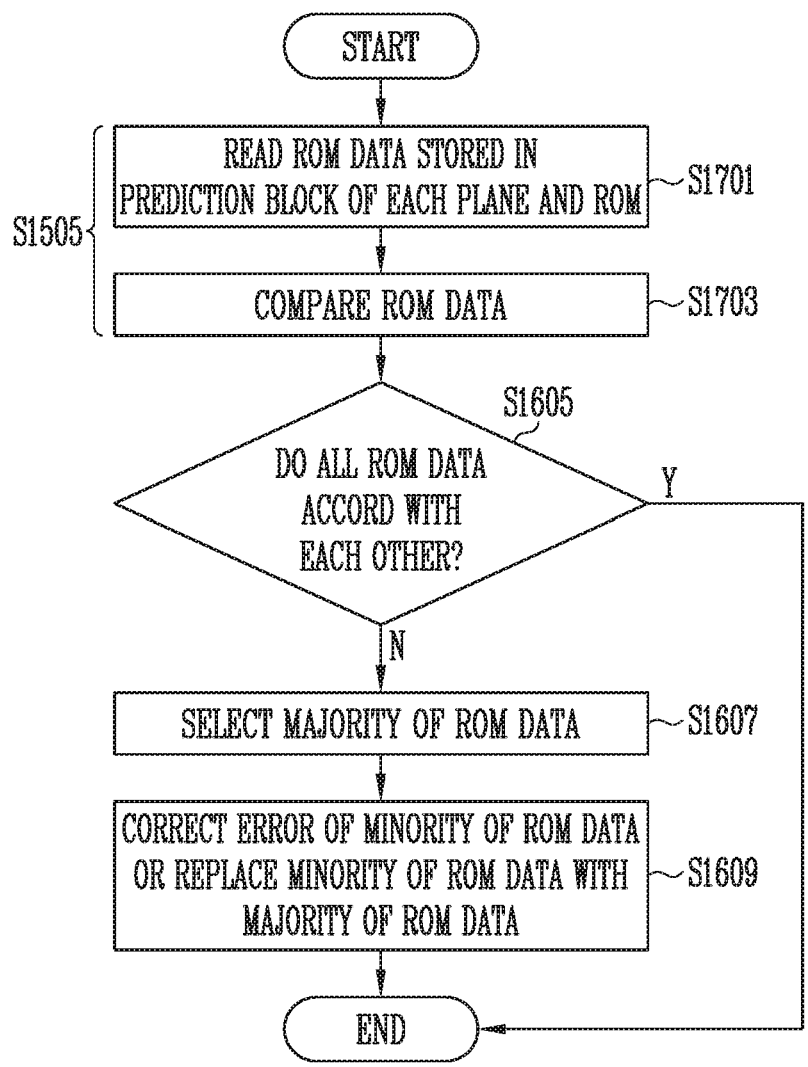
FIG. 17 is a diagram illustrating an operation of the memory device in accordance with an embodiment of the present disclosure.

FIG. 17 is a diagram illustrating an operation of the memory device in accordance with an embodiment of the present disclosure.

Referring to FIG. 17, steps S1701 and S1703 are substeps of step S1505.

In the step S1701, the memory device may read ROM data stored in the ROM while reading ROM data stored in a prediction block of each plane. In order to check whether the ROM data stored in the ROM has changed (whether an error has occurred), the memory device may read the ROM data stored in the ROM. When ROM data are read from the prediction block of each plane and the ROM, the memory device may compare the read ROM data (S1703). That is, the memory device 100 may determine whether the read ROM data are all the same.

In step S1605, the memory device may determine whether the read ROM data are the same. When all the read ROM data are the same (Y), the memory device may end an operation of comparing ROM data. However, when all the read ROM data are not the same (N), the memory device may select a majority of ROM data that are the same among the read ROM data (S1607).

For example, when Pith, P2th, and Rth ROM data, among P1th to P4th ROM data stored in each plane and the Rth ROM data stored in the ROM, are the same, the number of the same ROM data is "3," and the Pith, P2th, and Rth ROM data may be selected as a majority of ROM data.

When the majority of ROM data are selected, the memory device may determine that an error has occurred in remaining, or a minority of, ROM data (non-majority ROM data), and perform an operation for correcting the error of the minority of ROM data or replacing each piece of the minority of ROM data with a piece of the majority of ROM data (S1609).

Specifically, the memory device may output the minority of ROM data to the memory controller so as to correct the error of the minority of ROM data. Alternatively, the memory device may erase a prediction block in which the minority of ROM data is stored, and program any one of the majority of ROM data in the erased prediction block.

In another embodiment, when an error occurs in the ROM data stored in the ROM, the ROM data stored in the ROM cannot be corrected or replaced. Hence, the memory device does not read the ROM data from the ROM, but may perform an operation by reading any one of ROM data stored in the prediction blocks respectively included in the plurality of planes.

Figure 18:
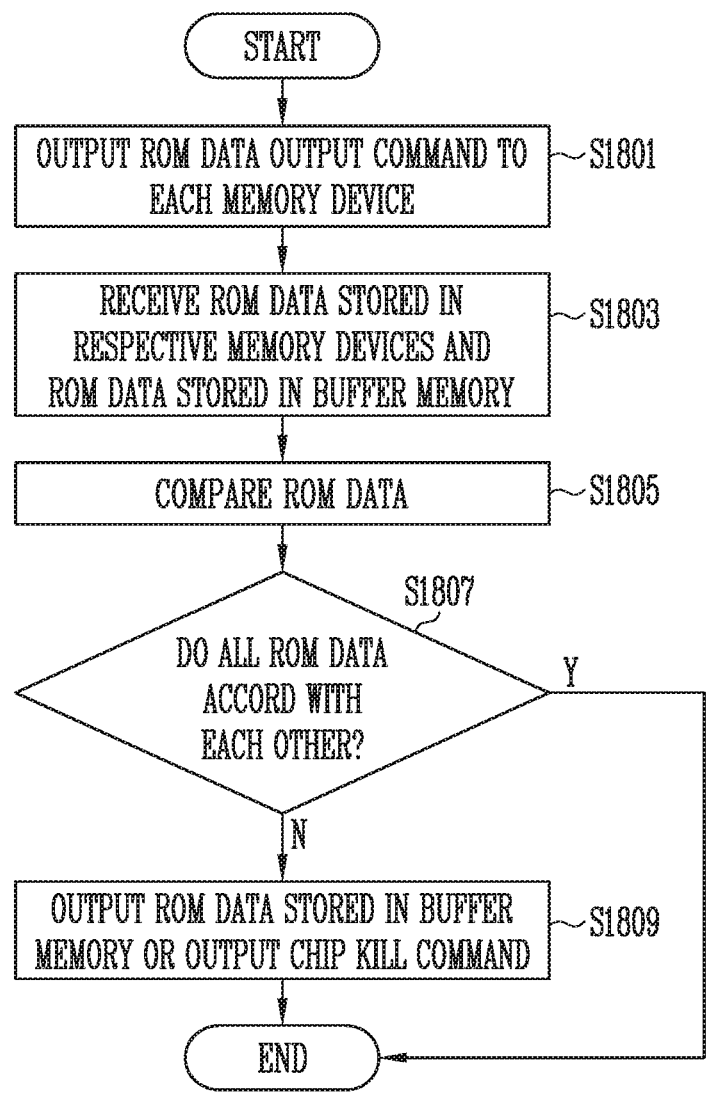
FIG. 18 is a diagram illustrating an operation of the memory controller in accordance with an embodiment of the present disclosure.

FIG. 18 is a diagram illustrating an operation of the memory controller in accordance with an embodiment of the present disclosure.

Referring to FIG. 18, in step S1801, the memory controller may output a ROM data output command to each memory device. That is, the step S1801 may be an operation step of the memory controller when all operation state information respectively output by a plurality of memory device include indicate a ready state of each memory device.

In step S1803, the memory controller may receive ROM data stored in the respective memory devices and ROM data stored in the buffer memory. Specifically, the memory controller may receive ROM data corresponding to the ROM data output command from each memory device, and receive ROM data corresponding to a ROM data output request from the buffer memory. The memory controller may compare the received ROM data (S1805). That is, the memory controller may determine whether the received ROM data are all the same.

In step S1807, the memory controller may determine whether all the received ROM data are the same. The ROM data stored in the buffer memory may be received from any one of the plurality of memory devices in an initialization operation of the memory device, or be stored in fabrication of the storage device. Hence, the ROM data stored in the buffer memory and the ROM data received from the plurality of memory devices should be the same in principle. However, since ROM data may be changed (since an error may occur) when an operation is performed in the memory device, it is necessary to check whether the ROM data has been changed (an error has occurred).

When the ROM data received from the plurality of memory devices and the buffer memory are all the same, the memory controller may end an operation of comparing ROM data. However, when the ROM data received from the plurality of memory devices and the buffer memory are not all the same, the memory controller may output the ROM data stored in the buffer memory or output a chip kill command (S1809).

The memory controller may determine a majority of ROM data that are the same, based on the received ROM data, and output the ROM data stored in the buffer memory to a memory device in which a minority of ROM data are stored so as to provide ROM data to the memory device in which the minority of ROM data are stored. Alternatively, the memory controller may output the chip kill command to a memory device in which a minority of ROM are stored such that any operation is not performed any more in the corresponding memory device.

In an embodiment, the memory controller may determine any one of the output of the ROM data stored in the buffer memory and the output of the chip kill command according to a remaining life of each of the plurality of memory devices.

For example, when the remaining life of a memory device is less than or equal to 20% of the total life of the memory device, the memory controller may output the chip kill command to the corresponding memory device. On the contrary, when the remaining life of the memory device exceeds 20% of the total life of the memory device, the memory controller may provide the ROM data stored in the buffer memory to the corresponding memory device.

Figure 19:
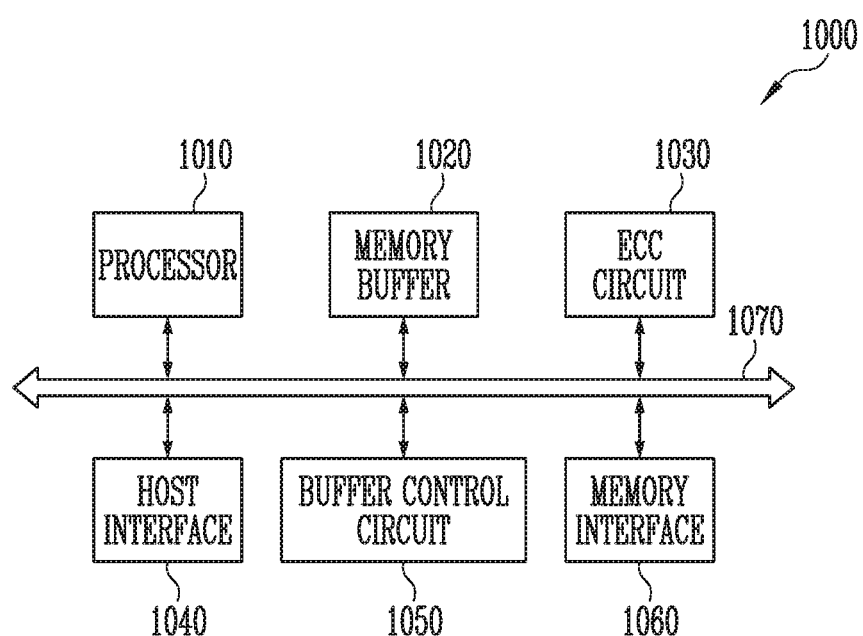
FIG. 19 is a diagram illustrating another embodiment of the memory controller shown in FIG. 1.

FIG. 19 is a diagram illustrating another embodiment of the memory controller shown in FIG. 1.

Referring to FIG. 19, a memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LPA, using a mapping table, to be translated into a PBA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

The processor 1010 may receive operation state information from the memory device 100 shown in FIG. 1, and output a ROM data output command, based on the operation state information. The operation state information based on which the ROM data output command is output may include information representing that the memory device 100 shown in FIG. 1 is in a ready state.

Also, when the processor 1010 receives ROM data information corresponding to the ROM data output command, the processor 1010 may perform an operation for correcting ROM data in which an error occurs or replacing the ROM data with another ROM data.

The processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050. Either of these components may be provided externally to the memory controller 1000 or the functionality thereof distributed to one or more components of the memory controller 1000.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, such that neither interferes nor influences the other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 20:
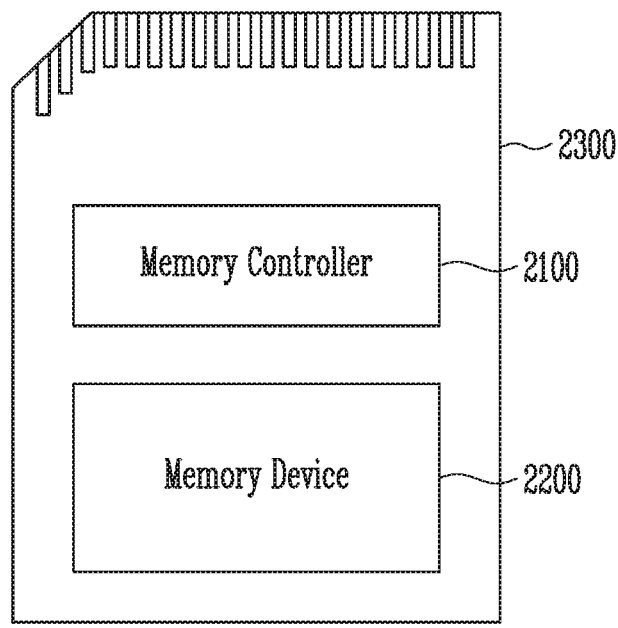
FIG. 20 is a block diagram illustrating a memory card system to which the storage device is applied in accordance with an embodiment of the present disclosure.

FIG. 20 is a block diagram illustrating a memory card system to which the storage device is applied in accordance with an embodiment of the present disclosure.

Referring to FIG. 20, the memory card system 2000 includes a memory controller 2100, a memory device, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory device 2200 may be configured the same as the memory device 100 described with reference to FIG. 2.

The memory controller 2100 may receive operation state information from the memory device 2200, and output a ROM data output command, based on the operation state information. The operation state information based on which the ROM data output command is output may include information representing that the memory device 2200 is in a ready state.

Also, when the memory controller 2100 receives ROM data information corresponding to the ROM data output command, the memory controller 2100 may perform an operation for correcting ROM data in which an error occurs or replacing the ROM data with another ROM data.

In an example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (DATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and/or NVMe.

In an example, the memory device 2200 may be implemented with any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and/or a Spin Torque Transfer magnetic RAM (STT-MRAM).

In an embodiment, the memory device 2200 may determine whether ROM data stored in prediction blocks respectively included in a plurality of planes are the same or whether ROM data stored in prediction blocks respectively included in a plurality of planes and ROM data stored in a ROM in the memory device 2200 are the same. When the ROM data are not all the same, the memory device 2200 may determine a majority of ROM data that are the same, and perform an operation for correcting an error occurring in a piece of non-majority ROM data (ROM data belonging to a minority) or replacing the piece of non-majority ROM data with a piece of the majority of ROM data.

The memory controller 2100 and the memory device 2200 may be integrated into a single semiconductor device to constitute a memory card, such as a PC card (Personal Computer Memory Card International Association (PCM-CIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and/or a Universal Flash Storage (UFS).

Figure 21:
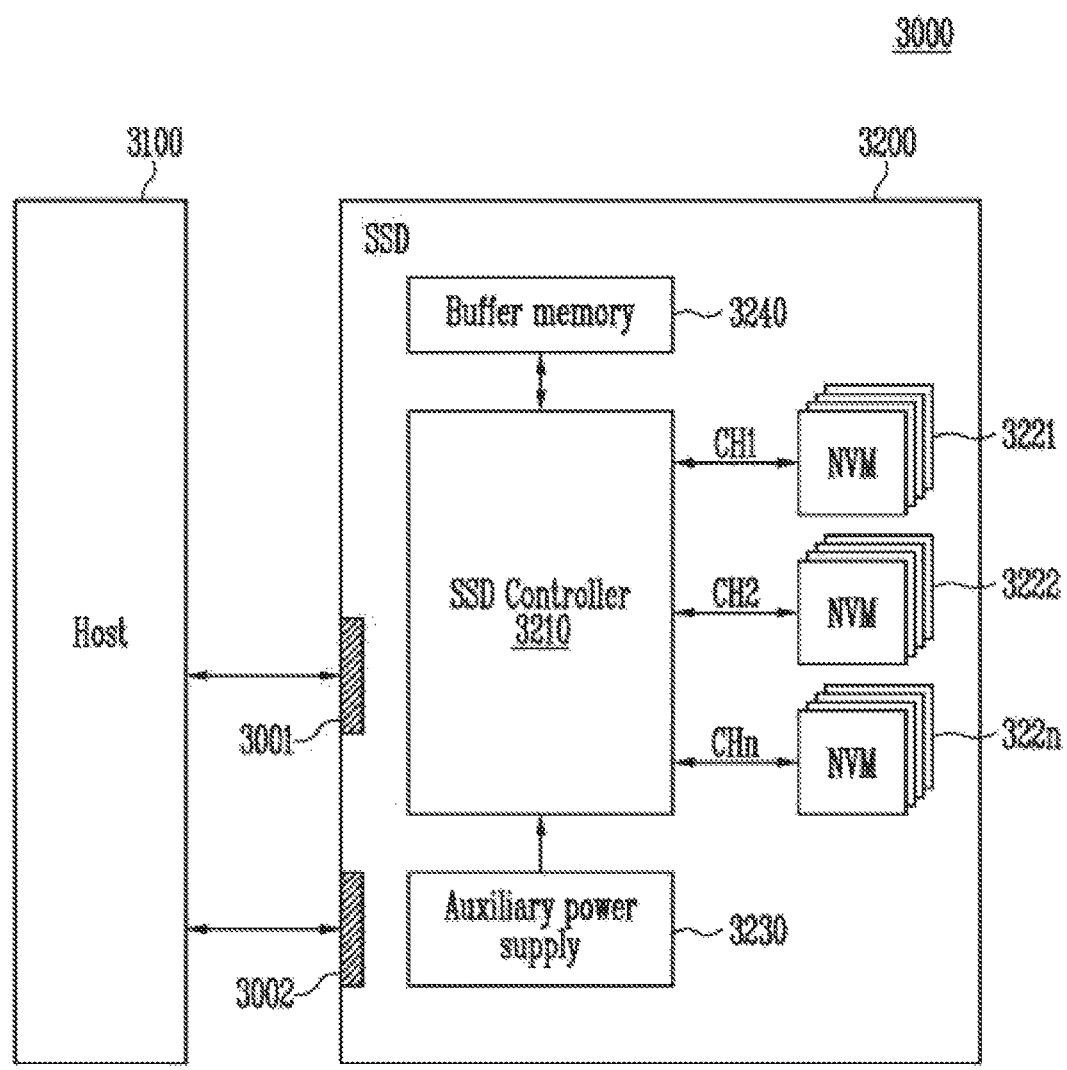
FIG. 21 is a block diagram illustrating a Solid State Drive (SSD) system to which the storage device is applied in accordance with an embodiment of the present disclosure.

FIG. 21 is a block diagram exemplarily illustrating a Solid State Drive (SSD) system to which the storage device is applied in accordance with an embodiment of the present disclosure.

Referring to FIG. 21, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be l based on an interface between the host 3100 and the SSD 3200. For example, the signal SIG may be defined by at least one of various interfaces, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and/or an NVMe.

The SSD controller 3210 may output a program direct read command to the plurality of flash memories 3221 to 322n. The program direct read command may instruct the memory device to determine pass or fail of a program operation, based on read data obtained by reading programmed data, when a program verify operation passes after the plurality of flash memories 3221 to 322n performs the program operation.

Subsequently, the SSD controller 3210 may manage a bad block by receiving program fail information corresponding to the program direct read command from the plurality of flash memories 3221 to 322n, and output a reprogram command to the plurality of flash memories 3221 to 322n such that the program operation is re-performed.

The SSD controller 3210 may receive operation state information from the plurality of flash memories 3221 to 322n, and output a ROM data output command, based on the operation state information. The operation state information based on which the ROM data output command is output may include information representing that the plurality of flash memories 3221 to 322n are in a ready state.

Also, when the SSD controller 3210 receives ROM data information corresponding to the ROM data output command from the plurality of flash memories 3221 to 322n, the SSD controller 3210 may replace ROM data in which an error occurs with ROM data stored in a buffer memory in the SSD controller 3210, or output a chip kill command such that any operation is not performed on a flash memory in which the ROM data in which the error occurs is stored among the plurality of flash memories 3221 to 322n.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located externally to the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 22:
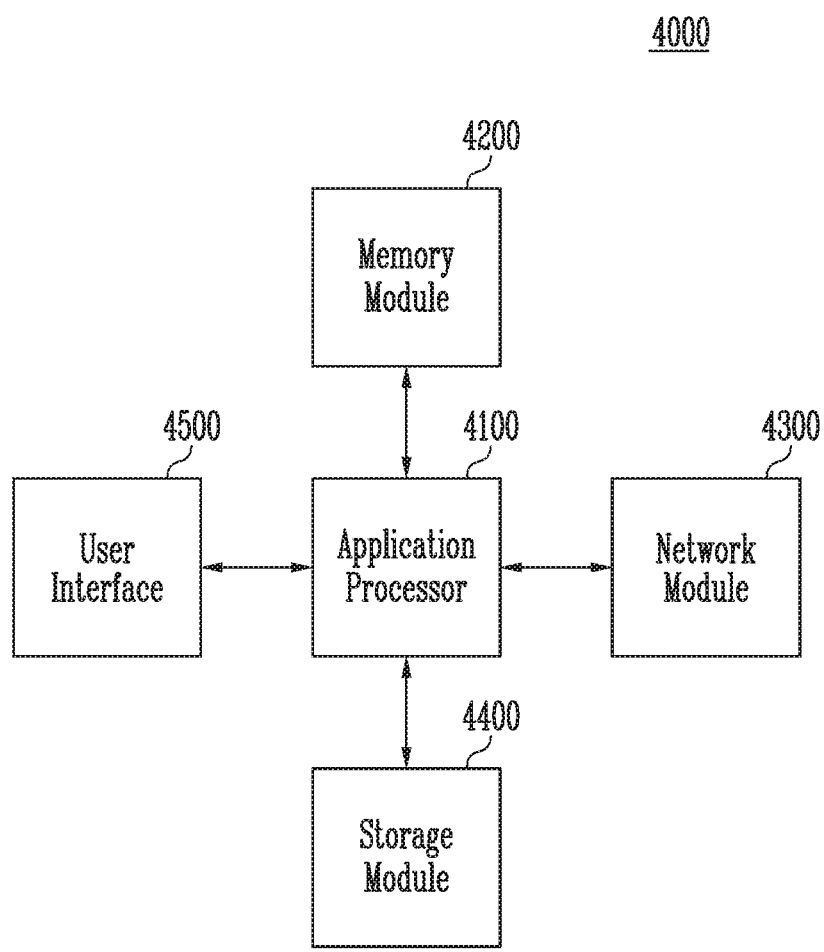
FIG. 22 is a block diagram illustrating a user system to which the storage device is applied in accordance with an embodiment of the present disclosure.

FIG. 22 is a block diagram illustrating a user system to which the storage device is applied in accordance with an embodiment of the present disclosure.

Referring to FIG. 22, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The application processor 4100 may output a program direct read command to the storage module 4400. The program direct read command may be a command instructing the memory device to determine pass or fail of a program operation, based on read data obtained by reading programmed data, when a program verify operation passes after the storage module 4400 performs the program operation.

Subsequently, the application processor 4100 may manage a bad block by receiving program fail information corresponding to the program direct read command from the storage module 4400, and output a reprogram command to the storage module 4400 such that the program operation is re-performed.

The application processor 4100 may receive operation state information from the storage module 4400, and output a ROM data output command, based on the operation state information. The operation state information based on which the ROM data output command is output may include information representing that the storage module 4400 is in a ready state.

Also, when the application processor 4100 receives ROM data information corresponding to the ROM data output command from the storage module 4400, the application processor 4100 may perform an operation for correcting ROM data in which an error occurs or replacing the ROM data with another ROM data.

The memory module 4200 may operate as a main memory, working memory, buffer memory or cache memory of the user system 4000. The memory module 4200 may include any of various volatile random access memories such as a DRAM, an SDRAM, a DDR SDRAM, a DDR2 SDRAM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, each of which may operate the same as the memory device described with reference to FIGS. 2 to 5. The storage module 4400 may operate the same as the storage device 50 described with reference to FIG. 1.

In an embodiment, the storage module 4400 may determine whether ROM data stored in prediction blocks respectively included in a plurality of planes are the same or whether ROM data stored in prediction blocks respectively included in a plurality of planes and ROM data stored in a ROM in the storage module 4400 may be the same. When the ROM data are not all the same, the storage module 4400 may determine a majority of ROM data, and perform an operation for correcting an error occurring in a minority of ROM data or replacing the minority of ROM data with the majority of ROM data.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with embodiments of the present disclosure, the reliability of a storage device for detecting a ROM data error and correcting the error can be improved.

While various embodiments of the invention have been illustrated and described, those skilled in the art will understand based on the present disclosure that various changes in form and details may be made therein without departing from the spirit and scope of the present invention as defined by the appended claims and their equivalents. Therefore, the scope of the present invention is not limited to the above-described embodiments; rather, the scope of the present invention is determined the appended claims their equivalents.

In the above-described embodiments, in some instances, not all steps or operations need be performed, and steps or operations may combined or performed in a different order than described. The disclosed embodiments are intended to facilitate an understanding of the present invention, not to limit it.

Although specific terminologies are used herein, they are used only to explain embodiments of the present invention, not to restrict it. Many variations and modifications are possible within the spirit and scope of the present invention. All such variations and modifications that fall within the scope of the claims are encompassed by the present invention.

What is claimed is:

1. A storage device comprising:
a memory device including a plurality of planes each storing Read Only Memory (ROM) data; and
a memory controller configured to output, to the memory device, a ROM data output command to read the ROM data respectively stored in the plurality of planes according to an operation state of the memory device, wherein the memory device is configured to determine a majority of ROM data which are the same among the ROM data read from the plurality of planes in response to the ROM data output command, and determine existence of non-majority ROM data among the ROM data, which is different from the majority of ROM data among the ROM data, and
wherein the memory controller is configured to, both a) in response to a remaining life of the memory device being less than a reference value and b) in response to a determination that at least one plane includes the non-majority ROM data from among the plurality of planes, output, to the at least one plane, a chip kill command to stop storing new data in the at least one plane.

2. The storage device of claim 1, wherein the memory controller comprises an operation state determiner configured to output the ROM data output command to a ROM data controller, when the operation state of the memory device is a ready state.

3. The storage device of claim 2, wherein the memory device further includes the ROM data controller configured to output an address, for reading the ROM data respectively stored in the plurality of planes, corresponding to the ROM data output command.

4. The storage device of claim 3, wherein the address for reading the ROM data is an address of a super block.

5. The storage device of claim 1, wherein the memory device further includes:
a ROM data controller configured to erase a memory block in which the non-majority ROM data is stored, and control the memory device to program any one of the majority of ROM data in the erased memory block.

6. The storage device of claim 1,
wherein the memory device further includes:
a ROM configured to store ROM data including codes for a program operation, a read operation, and an erase operation, respectively, and output the codes; and
a ROM data controller configured to, if the majority of ROM data is not determined, re-determine the majority of ROM data which are the same among ROM data additionally read from the ROM.

7. A storage device comprising:
a memory device including:
a Read Only Memory (ROM) configured to store ROM data including codes for a program operation, a read operation, and an erase operation, respectively, and output the codes;
a plurality of planes storing the ROM data, respectively; and
a ROM data controller configured to determine a majority of ROM data which are the same among the ROM data read from the plurality of planes and the ROM in response to a ROM data output command, and determine existence of non-majority ROM data among the ROM data, which is different from the majority of ROM data among the ROM data; and
a memory controller including:
an operation state determiner configured to output the ROM data output command according to an operation state of the memory device; and
a chip kill controller configured to, both a) in response to a remaining life of the memory device being less than a reference value and b) in response to a determination that at least one plane includes the non-majority ROM data from among the plurality of planes, output, to the at least one plane, a chip kill command to stop performing an operation of the at least one plane.

8. The storage device of claim 7, wherein the operation state determiner outputs the ROM data output command to the ROM data controller and the ROM when the operation state of the memory device is a ready state.

9. The storage device of claim 7, wherein, when the ROM data stored in the ROM does not belong to the majority of ROM data, the memory controller performs any one of the program operation, the read operation, and the erase operation by reading the ROM data stored in any one of the plurality of planes.

10. A storage device comprising:
a plurality of memory devices each including a memory block configured to store Read Only Memory (ROM) data including codes to be decoded to perform a program operation, a read operation, and an erase operation, respectively; and
a memory controller including:
a buffer memory configured to store ROM data initially identical to the ROM data respectively stored in the plurality of memory devices;
an operation state determiner configured to output a ROM data output command to read the ROM data respectively stored in the plurality of memory devices, and to output a ROM data output request to read the ROM data stored in the buffer memory, based on an operation state of each of the plurality of memory devices; and
a chip kill controller configured to output a chip kill command or a ROM data transmission request, according to whether the ROM data received from the plurality of memory devices and the ROM data received from the buffer memory are the same, and according to a remaining life of the plurality of memory devices,
wherein the chip kill controller is configured to:
determine a majority of ROM data, which are the same, among the ROM data received from the plurality of memory devices and the buffer memory, and
both a) in response to a determination that a memory device includes a non-majority ROM data among the ROM data from among the plurality of memory devices and b) in response to a remaining life of the memory device being less than a reference value, output, to the memory device, the chip kill command to stop performing an operation of the memory device, and wherein the non-majority ROM data is different from the majority of ROM data.

11. The storage device of claim 10, wherein, when the operation state of each of the plurality of memory devices is a ready state, the operation state determiner outputs the ROM data output command to the plurality of memory devices and the ROM data output request to the buffer memory.

12. The storage device of claim 10, wherein the chip kill controller outputs the ROM data transmission request to the buffer memory such that the ROM data stored in the buffer memory is output to the memory device in which the non-majority ROM data is stored.

13. The storage device of claim 12, wherein the memory device in which the non-majority ROM data is stored performs an operation by decoding codes included in the ROM data received from the buffer memory.

* * * * *